United States Patent [19]
Yoshida

[11] Patent Number: 5,650,939
[45] Date of Patent: Jul. 22, 1997

[54] POWER CONTROL APPARATUS FOR DIGITAL ELECTRONIC DEVICE, PROCESSING APPARATUS PROVIDED WITH THE POWER CONTROL APPARATUS, AND POWER MANAGEMENT SYSTEM FOR DIGITAL ELECTRONIC DEVICE HAVING THE PROCESSING APPARATUS

[75] Inventor: Yukihiro Yoshida, Ikoma, Japan

[73] Assignee: Sharp Kabushiki Kaisha, Osaka, Japan

[21] Appl. No.: 984,672

[22] Filed: Dec. 2, 1992

[30] Foreign Application Priority Data

Dec. 4, 1991 [JP] Japan ................... 3-320460
Oct. 30, 1992 [JP] Japan ................... 4-293111

[51] Int. Cl.$^6$ ........................................ G06F 1/26
[52] U.S. Cl. ........................ 364/492; 364/707; 395/750; 307/31; 307/38; 307/40
[58] Field of Search ................ 395/750; 364/707, 364/492, 948.4, 948.5, 948.6, 948.7, 948.8, 948.9, 948.91; 307/30, 31, 32, 33, 34, 35, 36, 37, 38, 39, 40, 41; 365/230.03

[56] References Cited

U.S. PATENT DOCUMENTS

| | | | |
|---|---|---|---|
| 4,203,153 | 5/1980 | Boyd | 395/750 |
| 4,365,290 | 12/1982 | Nelms et al. | 364/707 |
| 4,463,646 | 8/1984 | Mitarai | 307/31 |
| 4,593,349 | 6/1986 | Chase et al. | 395/750 |
| 4,612,619 | 9/1986 | Culp | 307/31 |
| 4,615,005 | 9/1986 | Maejima et al. | 364/707 |
| 4,851,987 | 7/1989 | Day | 364/707 |
| 4,980,836 | 12/1990 | Carter et al. | 307/31 |
| 5,036,493 | 7/1991 | Nielsen | 365/230.03 |
| 5,070,450 | 12/1991 | Holman, Jr. et al. | 395/750 |
| 5,167,024 | 11/1992 | Smith et al. | 395/375 |
| 5,191,520 | 3/1993 | Eckersley | 307/38 |
| 5,230,055 | 7/1993 | Katz et al. | 395/750 |
| 5,243,225 | 9/1993 | Schweer et al. | 307/31 |
| 5,276,889 | 1/1994 | Shiraishi et al. | 395/750 |
| 5,339,445 | 8/1994 | Gasztonyi | 395/750 |

*Primary Examiner*—Emanuel T. Voeltz
*Assistant Examiner*—Eric W. Stamber

[57] ABSTRACT

An apparatus for controlling electric power used by a digital electronic device. The apparatus includes a read only memory for outputting a coded electric power management order, and an address counter connected to the read only memory for accessing the read only memory. In addition, the apparatus includes a control order register connected to the read only memory for storing the coded electric power management order output from the read only memory. A control decoder is connected to the control order register for decoding the coded electric power management order stored in the control order register and for outputting a micro-order therefrom. Also included is the apparatus in a group of registers connected to the control order decoder for storing and processing the electric power control management order decoded by the control order decoder.

31 Claims, 31 Drawing Sheets

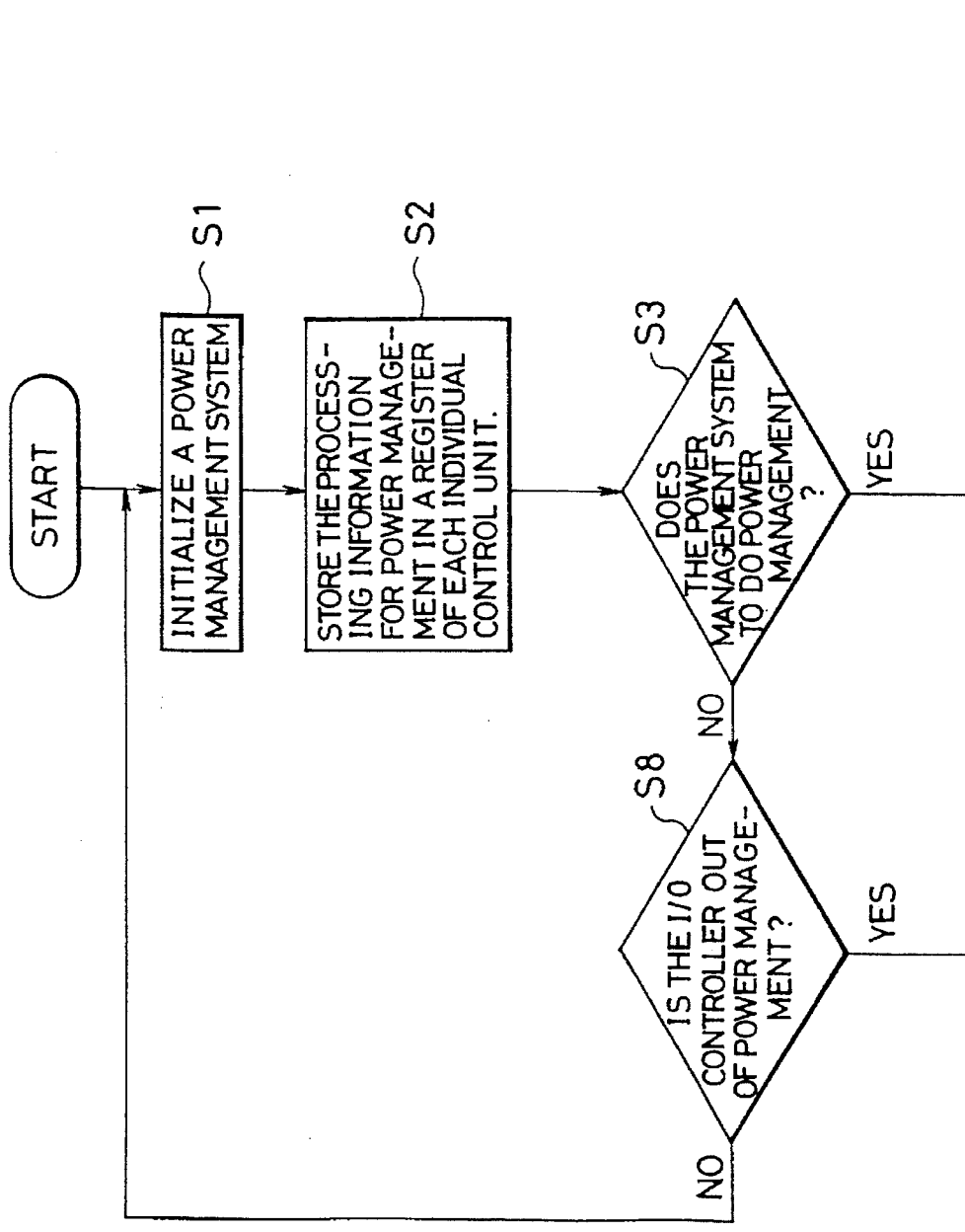

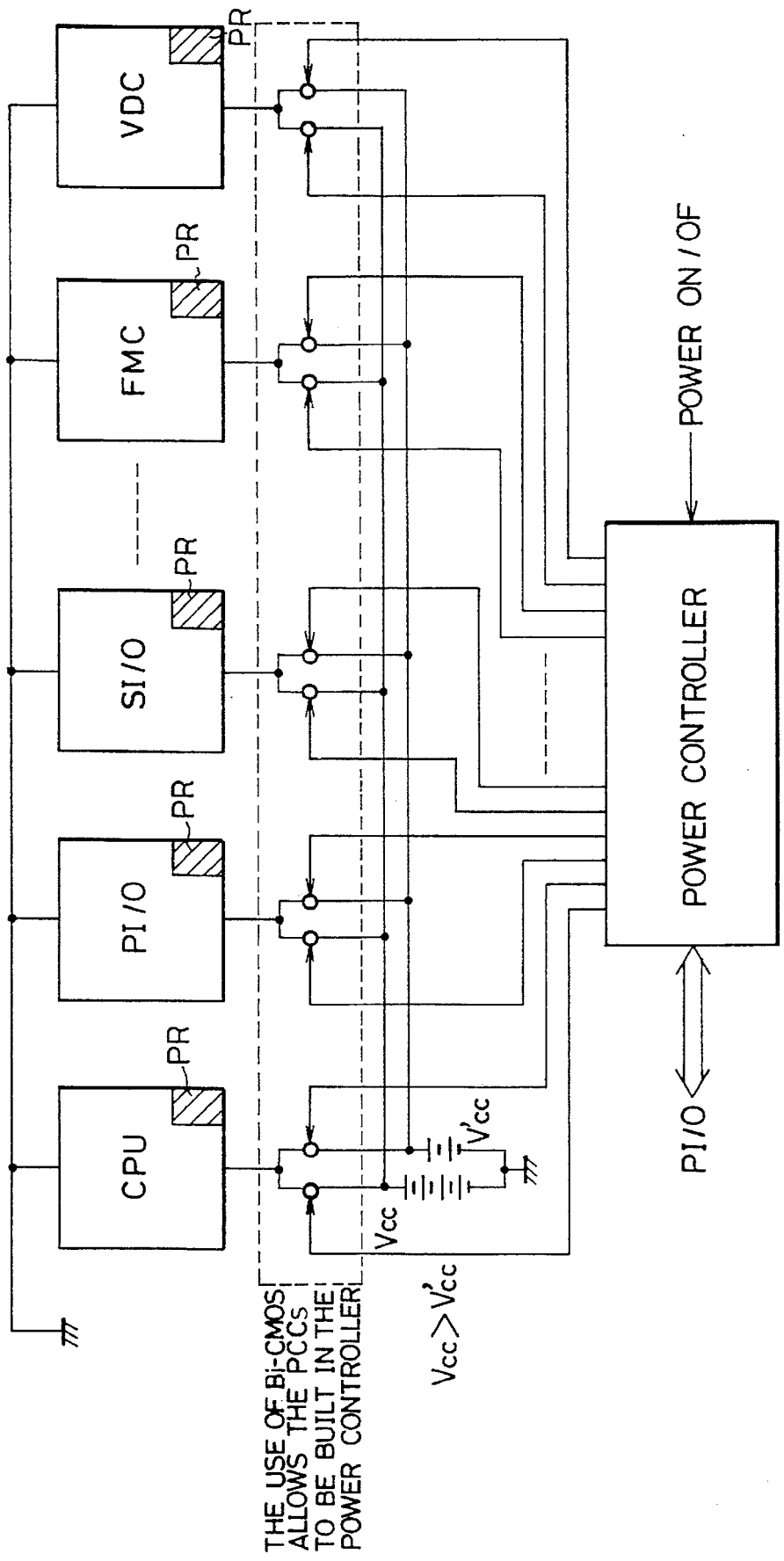

Fig.22(B)
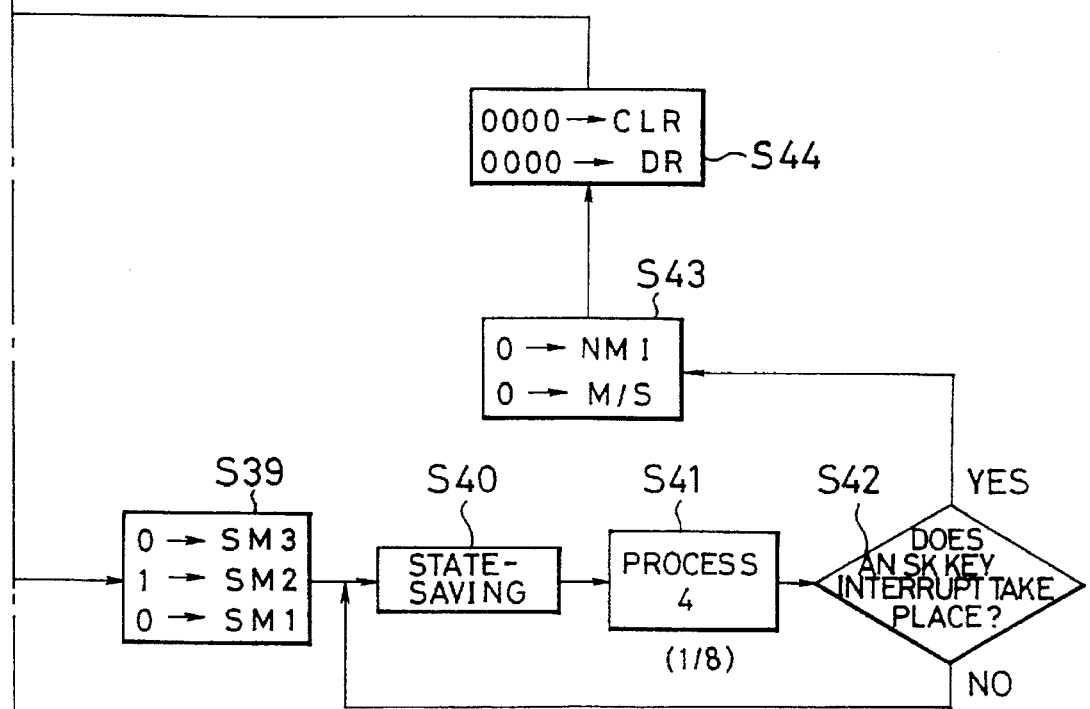
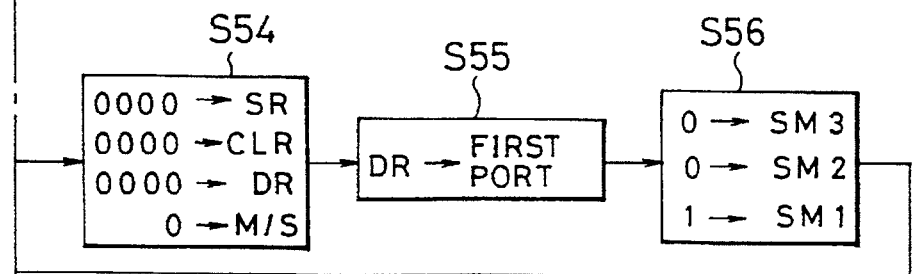

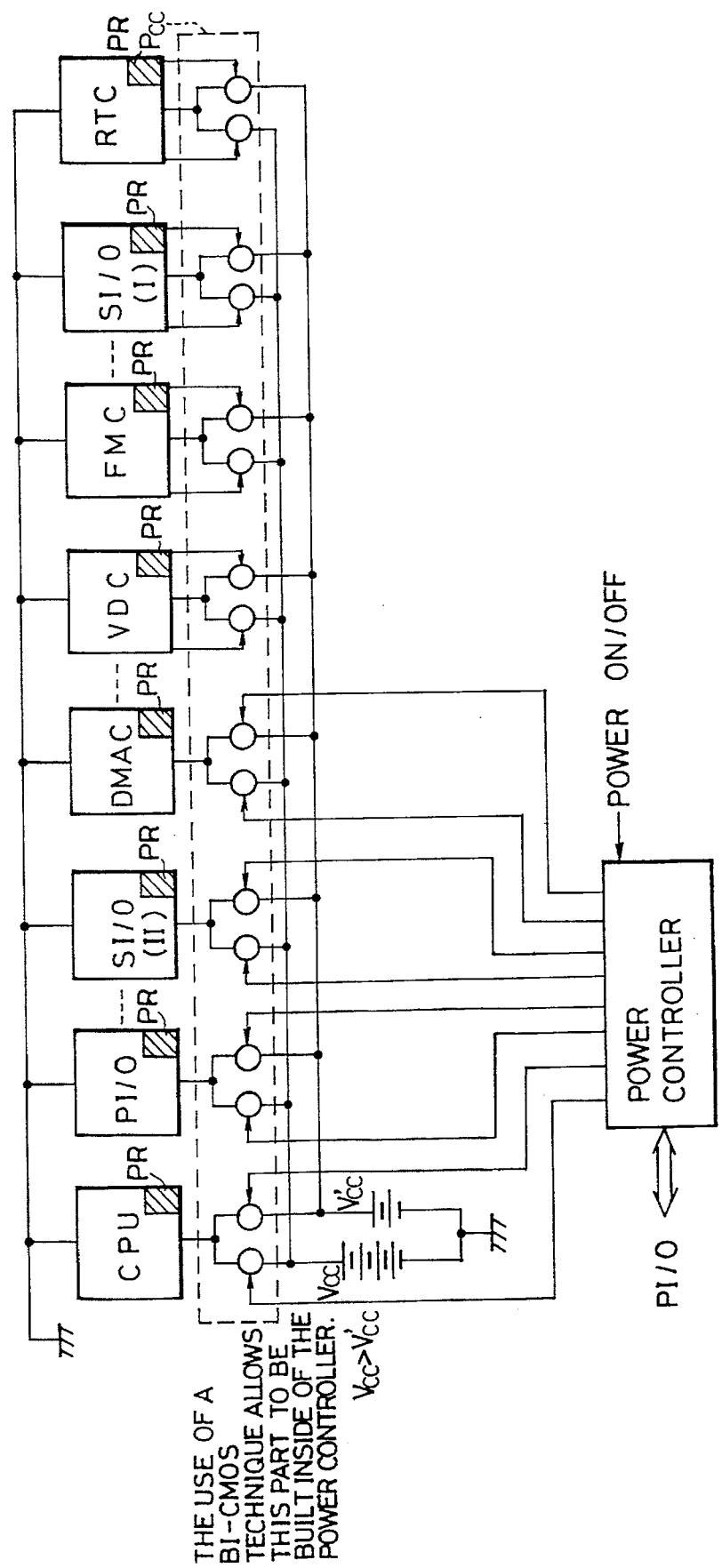

POWER CONTROL APPARATUS FOR DIGITAL ELECTRONIC DEVICE, PROCESSING APPARATUS PROVIDED WITH THE POWER CONTROL APPARATUS, AND POWER MANAGEMENT SYSTEM FOR DIGITAL ELECTRONIC DEVICE HAVING THE PROCESSING APPARATUS

BACKGROUND OF THE INVENTION

1. Field of the Invention

The present invention relates to a power control apparatus which may be used with a digital electronic device. The present invention also relates to a processing apparatus provided with the power control apparatus. The present invention additionally relates to a power management system for a digital electronic device having the processing apparatus.

2. Description of the Related Art

In general, a digital electronic device, for example personal computer is required to be battery-driven as it is further reduced in size. In order to meet the requirement, an electronic system, which is to be driven by less electric power, has now been developed.

In order to reduce the power consumption, in particular, a significant factor in the study of the digital system is to lower its power consumption by reducing the power consumed in semiconductor devices configuring the system (physical means) as well as by designing the system to reduce the power consumed in the overall system (logical means).

The digital electronic system is configured to have a central processing unit (CPU) having its proper data processing characteristic, various input/output (I/O) controllers, and storage devices (memories, buffers, etc.).

The power management system for a digital electronic system known by the present inventor employs a concentration power management system arranged to control power supply to the CPU, the I/O controllers, and the storage devices by a single power controller.

However, the above-mentioned power management system has no capability of controlling power to be supplied to the CPU and the I/O controllers respectively. This means that the system wastes power. Further, the power management system used in the above-mentioned power management system is configured on a basic input and output system (BIOS) requiring the operating system (OS) to be module-divided into one section depending on the hardware and the other section depending on the software. This configuration does not allow for high flexibility of design. This is another disadvantage of the above-mentioned power management system.

SUMMARY OF THE INVENTION

It is a first object of the present invention to provide a power control apparatus for a digital electronic device which is capable of controlling power supplied to the digital electronic device by logical means.

The above object can be achieved by an apparatus for controlling electric power used by a digital electronic device, that includes a storage unit for outputting a coded electric power management order, an accessing unit connected to the storage unit for accessing the storage unit, an order-controlling unit connected to the storage unit for storing the coded electric power management order output from the storage unit, a decoding unit connected to the order-controlling unit for decoding the coded electric power management order stored in the order-controlling unit and for outputting a control signal therefrom, and a plurality of registers connected to the decoding unit for storing and processing the electric power control management order decoded by the decoding unit.

Preferably, the apparatus further includes a memory on which orders can be written.

More preferably, the storage unit is a program storage unit which is adapted to output the orders written on the memory.

The accessing unit is preferably a counting unit connected to the program storage unit for accessing the memory.

The order-controlling unit is a control-order resister connected to the program storage unit, the control-order resister being preferably adapted to store the orders written on the memory.

The decoding unit is a control-order decoder connected to the control-order register, the control-order decoder being adapted to decode the orders stored in the control-order register and to preferably output the control signal.

The plurality of registers are a group of registers connected to the control-order decoder, each of the registers being adapted to store and process the orders of power management and data at a time when turning on a system.

The memory is preferably a read-only-memory.

The counting unit is an address counter.

The apparatus is a private controller which includes a logic for switching a master-slave relation between a private controller, a central processing unit, and an input/output controller according to a wait-and-save event or a return-event.

The private controller further includes logic for detecting a turn-on of the power management according to a wait-and-save event or a return-event.

The control-order decoder is adapted to output the control signal which is a micro-order, the micro-order being capable of controlling an input/output gate of each register inside of the private controller, registers of the central processing unit, registers of the input/output controller, and an input/output gate of the memory, respectively.

The program storage unit includes a read-only memory and is adapted to output an order program written on the read-only memory according to a micro-order output from the control-order decoder.

The group of registers include a command register, a data register, a status register, and a control register.

In an operation of the power control apparatus for a digital electronic device according to the first aspect of the invention, the storage unit serves to output a coded power management instruction. The accessing unit is connected to the storage unit so that it may have an access to the storage unit. The order control unit is also connected to the storage unit so that it may store the coded power management order output from the storage unit. The decoding unit is connected to the order control unit for decoding the coded power management order stored in the order control unit. The two or more resisters are connected to the decoding unit for storing the power management order decoded by the decoding unit and processing the order.

It is a second object of the present invention to provide a processing apparatus for a CPU and an I/O controller which provides the power control apparatus for a digital electronic device controlling power to the CPU and I/O controllers respectively.

The above object can be achieved by an apparatus for processing to set an electric power source in a predetermined mode so as to reduce consumption of electric power and for controlling an input and an output according to the set mode, includes an apparatus for controlling an electric power used by a digital electronic device.

Preferably, the controlling apparatus includes a storage unit for outputting a coded electric power management order, an accessing unit connected to the storage unit for accessing the storage unit, an order-controlling unit connected to the storage unit for storing the coded electric power management order output from the storage unit, decoding unit connected to the order-controlling unit for decoding the coded electric power management order stored in the order-controlling unit and for outputting a control signal therefrom, and a plurality of registers connected to the decoding unit for storing and processing the electric power control management order decoded by the decoding unit.

In an operation of the processing device according to the second aspect of the invention, the power control unit for a digital electronic device is arranged to set the power source to a predetermined mode and control the input and the output based on the set mode for the purpose of reducing power consumption.

It is a third object of the present invention to provide a power management system for a digital electronic device which is capable of individually controlling power of a CPU and various I/O controllers configuring a digital electronic device provided with the power control apparatus according to the above object, for the purpose of reducing the power consumption of the overall power management system and allowing for high freedom.

The above object can be achieved by a system for managing electric power used by a digital electronic device, includes, an apparatus for processing to set an electric power source in a predetermined mode so as to reduce consumption electric power and for controlling an input and an output according to the set mode.

Preferably, the processing apparatus includes an apparatus for controlling an electric power used by a digital electronic device.

Preferably, the controlling apparatus includes a storage unit for outputting a coded electric power management order, an accessing unit connected to the storage unit for accessing the storage unit, order-controlling unit connected to the storage unit for storing the coded electric power management order output from the storage unit, a decoding unit connected to the order-controlling unit for decoding the coded electric power management order stored in the order-controlling unit and for outputting a control signal therefrom, and a plurality of registers connected to the decoding unit for storing and processing the electric power control management order decoded by the decoding unit.

The system has different kinds of transition states and is capable of changing the transition states variously according to various events.

Each of the central processing unit and the input/output controllers has different kinds of transition states respectively and is capable of changing the transition states variously according to various events.

The private control unit is installed for each of the central processing unit and the input/output controllers separately, each of the private control units is adapted to control electric power dispersively according to characteristics or states of the central processing unit or the input/output controller having inherent processing characteristics so as to control electric power of the system overall.

Each of the private control units is adapted to set a power management order, the electric power in each of the central processing unit and the input/output controllers is controlled according to the power management order set by the private control units, and another private control unit outputs a request of an electric power source control to a specified private control unit and controls electric power source of each of the central processing unit and the input/output controllers through a power control unit so as to reduce electric power.

Each of the private control units is adapted to set a power management order, the electric power in each of the central processing unit and the input/output controllers is separately controlled according to the power management order set by each of the private control units, and each of the private control units controls an electric power source in each of the central processing unit and the input/output controllers in which its own power management is performed by itself so as to reduce electric power.

Each of the private control units is adapted to set a power management order, the electric power in each of the central processing unit and the input/output controllers is separately controlled according to the power management order set by each of the private control units, in each of the private control units, different kinds of modes enabling to reduce a consumption of an electric power are set, and each of the private control unit executes a power management order according to the mode so as to control the electric power.

The system has special keys for reducing consumption of electric power by an operator externally, in case that each of the private control units detects an input of the special keys, each of the central processing units and the input/output controllers composing the system is set to a wait-and-save state at any time, and the system as a whole also is set to a wait-and-save state, further, in case that each of the private control units detects an input of the special keys again, then each of the central processing unit and the input/output controllers returns to a previous state, and the system as a whole also returns to a previous state.

Each of the private control units performs the electric power control according to the special keys at a time when each of the private control units executes a power management order so as to reduce consumption of electric power.

The private control unit is adapted to be set in each of the central processing unit and the input/output controllers as well as other memories composing the system, a number of the private control units could be reduced, and a number of the private control units could be set freely according to a system applied.

The system is arranged to reduce consumption of an electric power by controlling an electric power source and a clock frequency only, then the private control unit can be independently set externally, and controls electric power sources of each of the central processing unit, the input/output controllers, and other memories composing the system.

Preferably, the private control unit is adapted to control an electric source for each of central processing unit and input/output controllers so that time periods of high-level as well as low-level driving electric voltages are exist and an operational frequency is also shifted upwards and downwards in a time scale.

Preferably, the private control unit is further adapted to control steadily processing speed of the system as a whole by reducing consumption of electric power of the system and by controlling a rising-up and a slowing-down of the processing speed according to states of the system.

The states of the system preferably include an execution state and a non-execution state.

In an operation of the power management system for a digital electronic device according to the third aspect of the invention, the processing devices are configured as one or more large-scale integrated circuits. The power management system serves to control the powers being supplied to those processing devices for the purpose of lowering the power consumption of one or more large-scale integrated circuits.

Further objects and advantages of the present invention will be apparent from the following description of the preferred embodiments of the invention as illustrated in the accompanying drawings.

BRIEF DESCRIPTION OF THE DRAWINGS

FIGS. 2(A) and 2(B) illustrate for describing an operation of the private control unit shown in FIG. 1;

FIG. 7 is a block diagram showing a power management system providing the power control circuit shown in FIG. 8;

FIGS. 22(A) and 22(B) illustrate third flowchart showing an operation of a private control unit configuring a parallel I/O controller shown in FIG. 1;

FIG. 28 is a block diagram showing a third embodiment of a power management unit arranged to have the first and the second embodiments combined therewith.

DESCRIPTION OF THE PREFERRED EMBODIMENTS

Figure 1:
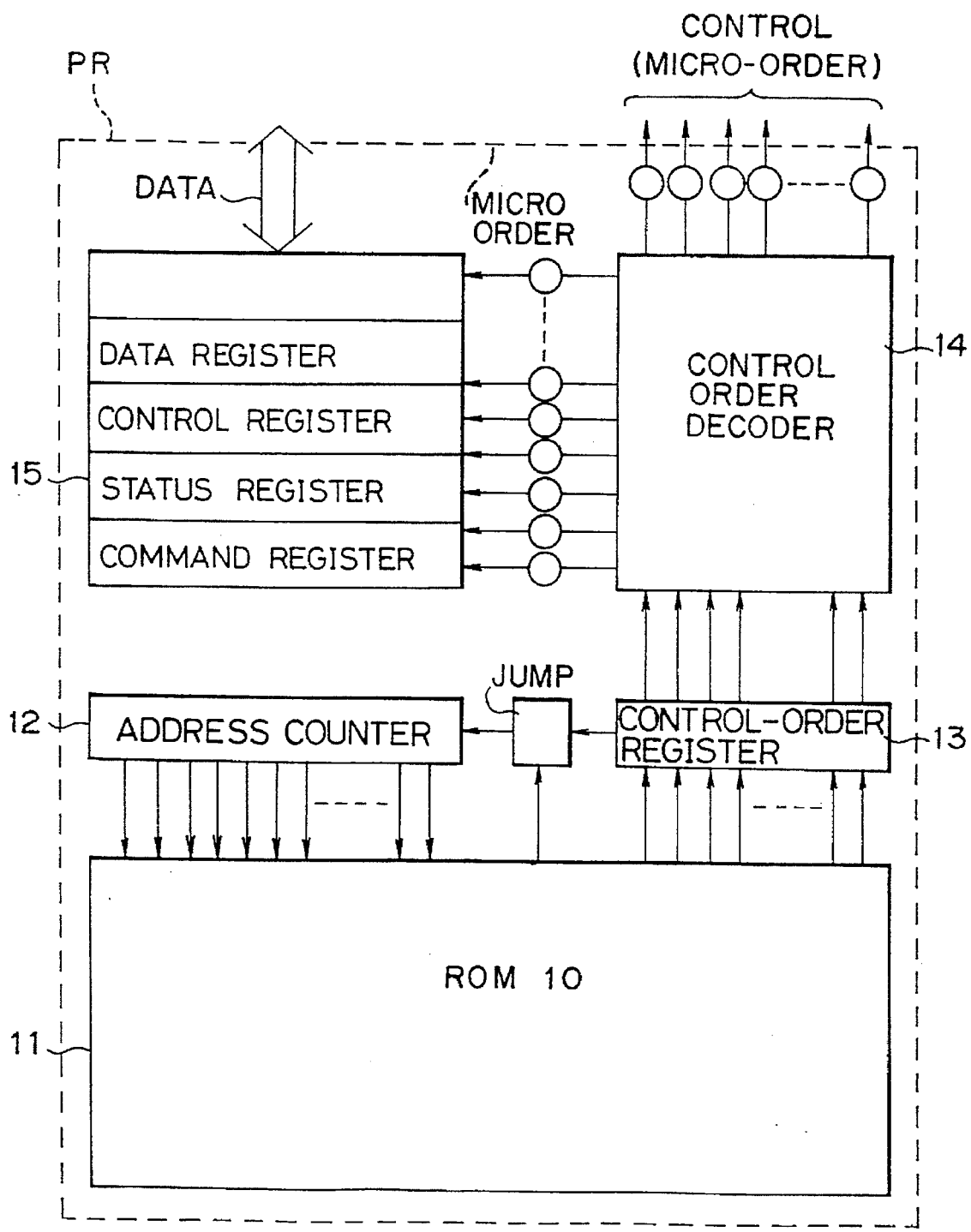
FIG. 1 is a block diagram showing an private control unit, that is, an embodiment of a power control unit for a digital electronic device.
Figure 2B:
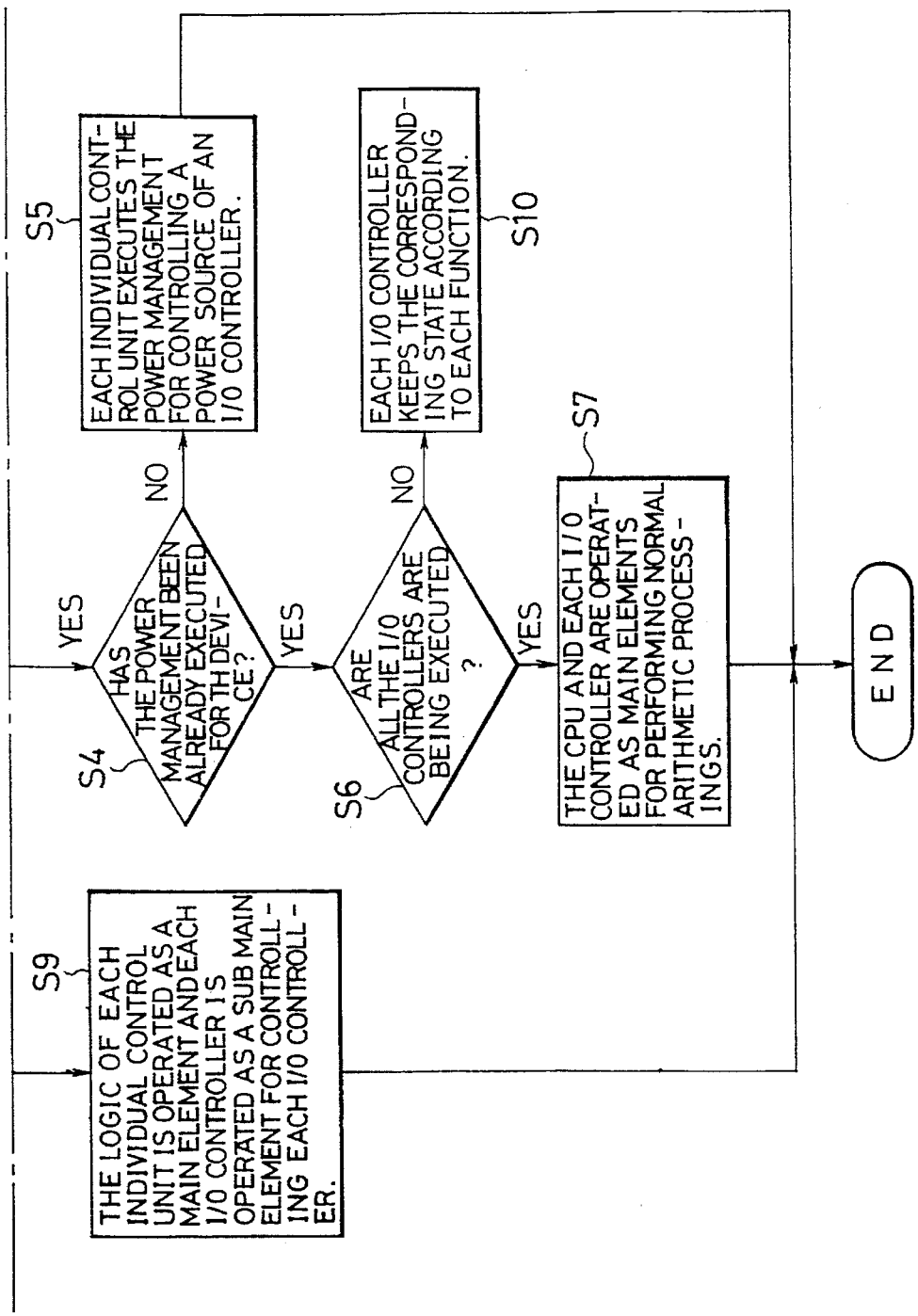

Referring to the accompanying drawings, an embodiment of a power control apparatus for a digital electronic device, an embodiment of a processing device provided with the power control apparatus, and an embodiment of a power management system for a digital electronic device provided with the processing device according to the present invention will be described in detail.

A power control apparatus for a digital electronic device according to a first embodiment of the present invention will be described by referring to FIG. 1, which is a block diagram showing a private control unit PR.

The private control unit PR is configured to have a program storage unit 11 for outputting an instruction written in a read-only memory (ROM) 10, an address counter 12 connected to the program storage unit 11 and for accessing the ROM 10, a control-order register 13 connected to the program storage unit 11 and for storing an instruction written in the ROM 10, a control-order decoder 14 connected to the control-order register 13 and for decoding an instruction stored in the control-order register 13 and storing the instruction written in the ROM 10, and outputting a control signal (micro-order), and a register group 15 connected to the control-order decoder 14 and for storing and processing a power-management instruction and data when the system is powered.

The control-order decoder 14 and the register group 15 are both connected to a CPU or each I/O controller connected to the private control unit PR. The resister group 15 operates to receive the data from or send the data to the CPU or each I/O controller. The control order decoder 14 operates to output the micro-order to the CPU or each I/O controller for controlling the CPU or each I/O controller.

The private control unit PR provides two logics, one for switching a depending relation among the private control unit PR itself, the CPU and each I/O controller by an interrupt of a state-saving (wait-and-save) event or a return event and the other for sensing that the power management is started.

When it is powered, an instruction for power management corresponding to the function of the CPU or each I/O controller is input to the command register and the data register of the private control unit PR. To decode and execute each instruction, the ROM 10 stores an individual program for each instruction. For example, the program storage unit 11 included in the private control unit PR of the CPU stores a different program from the program storage unit 11 configuring the private control unit PR of the parallel I/O controller. As another means, in place of the ROM 10, an AND or OR gate may be used for the program storage unit for the private control unit PR according to each function.

The private control unit PR may be integrally formed with or removably attached with the device it belongs to.

Further, the program storage unit 11 included in the private control unit PR may be integrally formed with or removably attached with the private control unit PR itself.

The instruction or data for power management notified to the private control unit PR by the CPU is input to the command register or the data register included in the register group 18 through an address bus or a data bus. The instruction used in the private control unit PR uses the same type as the normal microcomputer, that is, a machine language instruction composed of an operand and an operator.

The micro-order serves to control an I/O gate of each register, the registers of the CPU and each I/O controller and an I/O gate of a memory.

Next, the description will be oriented to the operation of each component of the private control unit PR.

The program storage unit 11 contains the ROM 10 and operates to output the instruction program written in the ROM 10 on the basis of the micro-order output from the control-order decoder 14. As mentioned above, the program storage unit 11 may be an AND or OR gate in place of the ROM according to each function of the private control unit PR. This embodiment concerns with the use of the ROM.

The address counter 12 operates to access the ROM 10. The control-order register 18 stores an instruction program written in the ROM 10. The control-order decode 14 serves to decoder the instruction stored in the control-order register 13 and output the micro-order to the register group 15 and the I/O controller (or CPU) connected to the private control unit PR itself. The register group 15 is arranged to have a command register, a data register, a status register and a control register. Those registers are grouped into two parts, one part for storing the instruction or data for power management given to the private control unit PR for the CPU by the CPU itself and the same given to the private control unit PR for each I/O controller given by the CPU itself and the other part used for processing the instruction for power management by the private control unit PR.

The private control unit PR shown in FIG. 1, by itself, composes a small-scaled microcomputer. As described later, it corresponds to a digital electronic device. To configure a distributed power management system for individually power-managing the CPU and each I/O controller, the private control units PR are provided for the CPU and each I/O controller having their own proper processing characteristics. Hereafter, the power management system may be often referred to as simply "system".

Figure 21A:
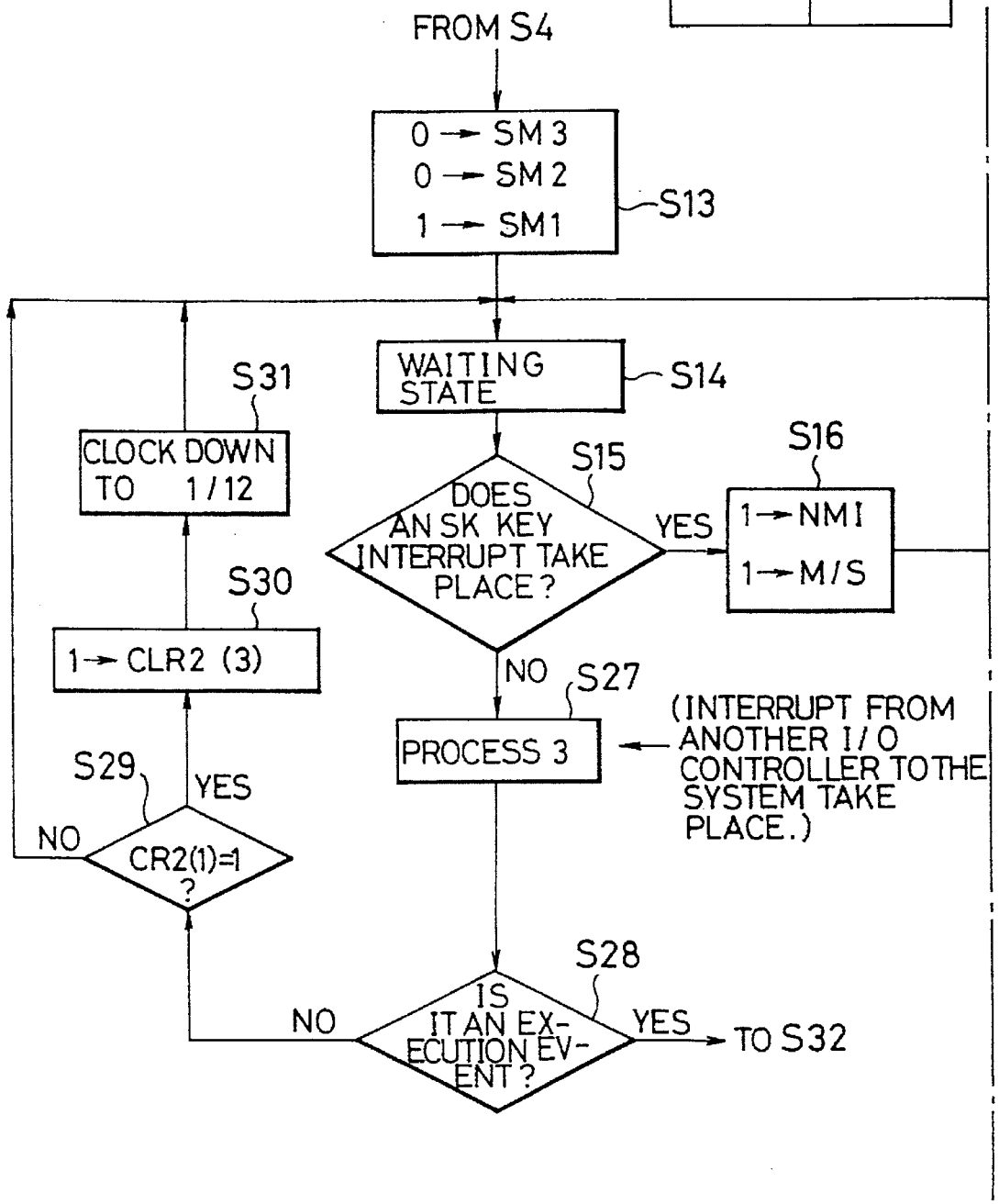
FIGS. 21(A) and 21(B) illustrate for explaining an operation of an private control unit configuring a parallel I/O controller shown in FIG. 1.
Figure 22A:
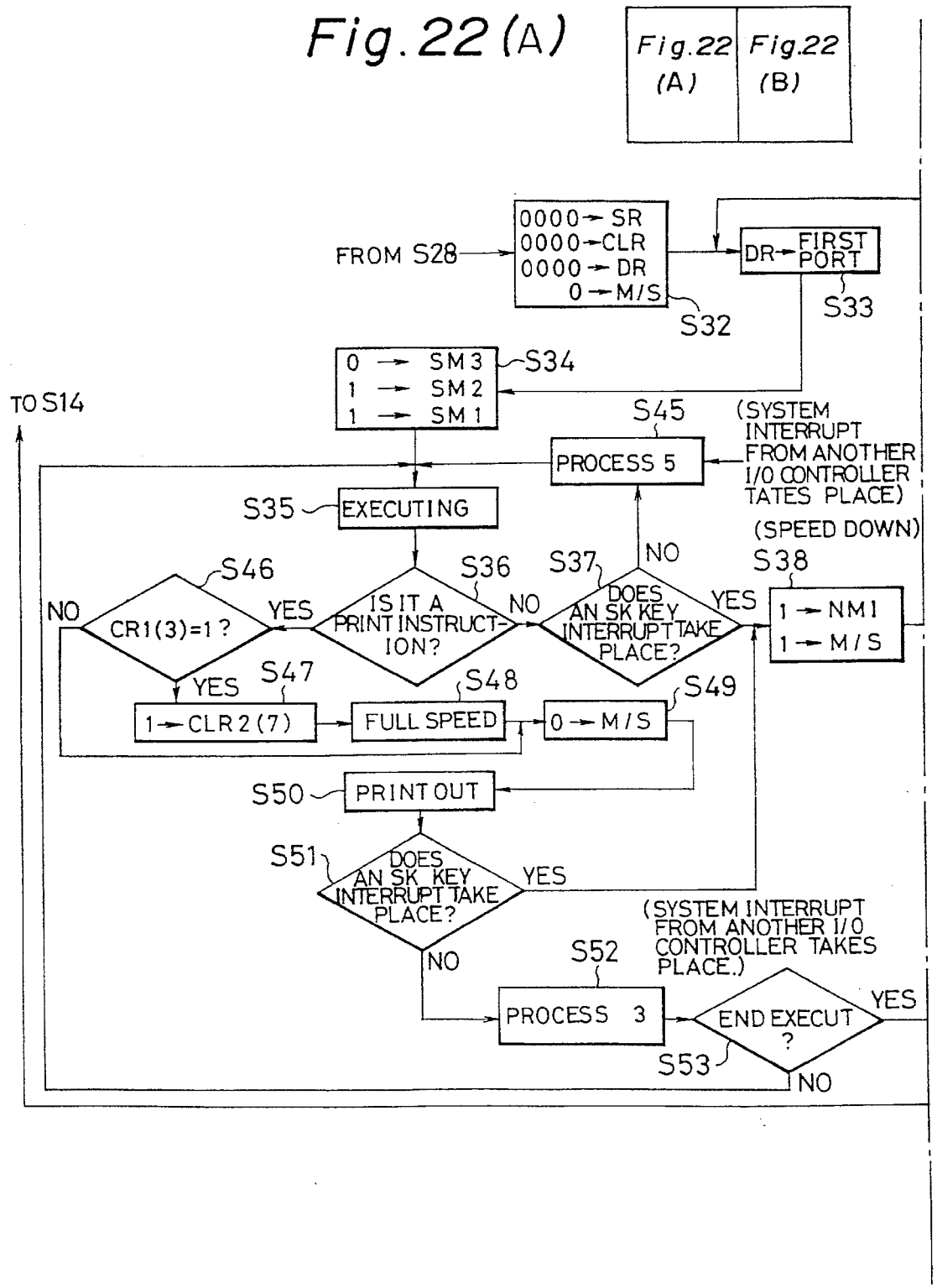

Next, the description will be oriented to the operation of the private control unit PR included in the power management system, in particular, the operation of the private control unit PR connected to the CPU and each I/O controller as referring to FIGS. 21(A) and 22(B).

At first, the management system is powered on and initialized (step S1). The processing information for power management according to each function is pre-stored in the register included in the private control unit PR for the CPU and each I/O controller under the control of the CPU (step S2). Then, it is sensed whether or not the initialized management system needs to do power management (step S3).

If yes at the step S3, it is determined whether or not the private control unit PR for each I/O controller has already executed the power management according to each function (step S4). At the step S4, if no, the private control unit PR for each I/O controller executes the power management according to each function for controlling the power of each I/O controller (step S5). If yes at the step S4, the power management has been executed for each I/O controller. It is determined whether or not the power management is now being executed for each I/O controller (step S6). If yes at the step S6, the CPU or each I/O controller is operated as a main element for executing the normal operations or the like (step S7). It is determined whether or not the power management needs each I/O controller at the step S3 and the private control unit PR of each I/O controller stays out of the power management (step S8). If yes at the step S8, the logic of the private control unit PR of each I/O controller is operated as a main element and each I/O controller is operated as a sub element for controlling each I/O controller (step S9).

If no at the step S6, each I/O controller is maintained in the corresponding state for its function (waiting, standby, execution) (step S10). As an example, when an event of the power management needs to be in a full-power state, the private control unit PR of the CPU is operated as a main element and the CPU is operated as a sub element. The power management is executed on the logic of the private control unit PR so that it may enters into the DC-biased timing. On this timing, when a return event is input from the key or the timer, the CPU is operated as a main element so as to notify each I/O controller of the fact that the power management system is returned before the CPU enters into the executing state. The private control unit PR of the CPU is operated as a sub element.

In a case that the power management system uses a floppy disk or a hard-disk, the private control unit PR shown in FIG. 1 is capable of executing the power management.

Figure 3:
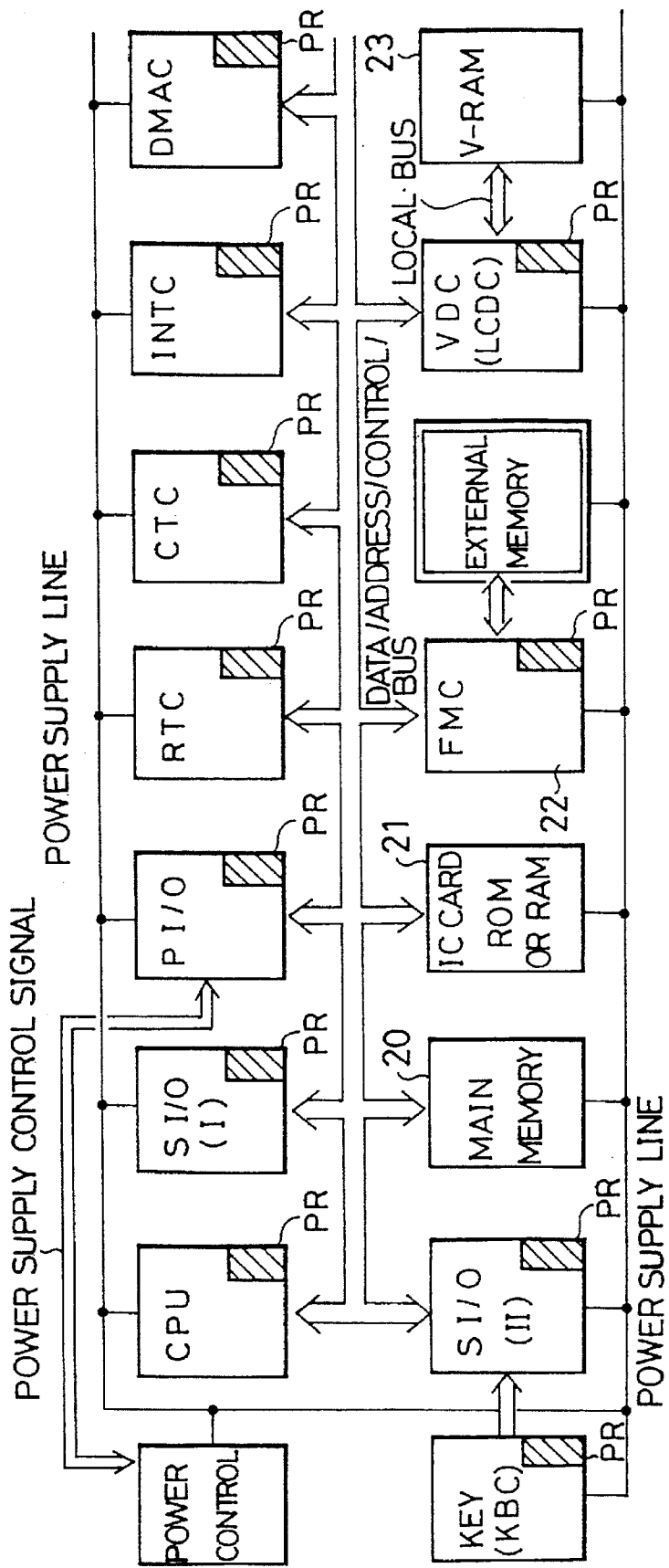
FIG. 3 is a block diagram showing one arrangement of a system providing the private control unit shown in FIG. 1.

FIG. 3 is a block diagram showing a power management system providing the private control unit PR shown in FIG. 1.

This power management system uses a flash memory as an IC card or an external storage unit and provides a power control unit for controlling a power source by a wait-and-save event or a return event.

This power management system executes the substantial power control of each I/O controller by a power control output sent from a parallel I/O controller.

In FIG. 3, it looks like that a supply line is series-connected to this power management system. Physically, the supply line is connected to the CPU and each I/O controller in parallel. Further, this power management system is arranged so that a power source may be connected to a main memory 20, an IC card 21, a flash memory 22, and a memory such as a V-RAM 23 in series or parallel. This power management provides eleven private control units PR. If those private control units PR set a DC-biased mode (standby) as "1" and the other mode as "0", the power management system may provide two states. This enhances the freedom of the power management system. The distributed power management system providing the private control units PR does not need to support a basic input and output system (BIOS). All the private control units PR are started up by an I/O trap or various I/O interrupts. Except the top priority interrupt on a real-time clock, the power management system is capable of accepting an interrupt of a special key SK (to be described later) such as a wait-and-save key or a return key.

Figure 4:
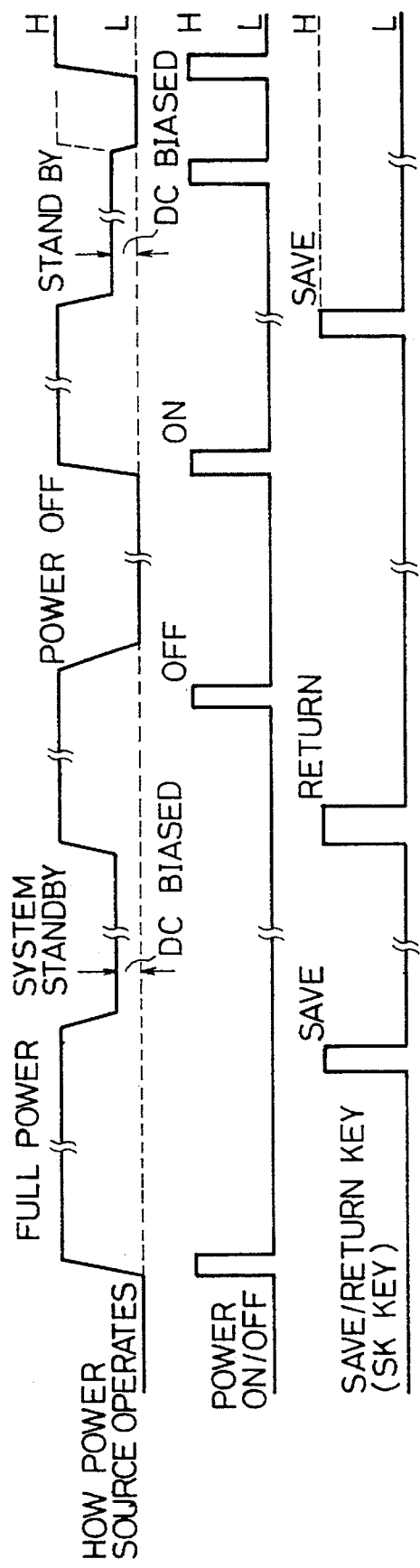
FIG. 4 is an explanatory view showing how a power source operates when the power source is put at a full power mode or a DC-biased mode.

FIG. 4 shows how the power source is operated when the power source is changed into a full-power state or a DC-biased state by switching a power switch or a special key SK such as a wait-and-save key or a return key.

The operation of the power source is variable on time according to the state of the CPU and each I/O controller. In a certain state of the power management system, the operations of the CPU and each I/O controllers are equivalent to the operation of the power management system.

Figure 5B:
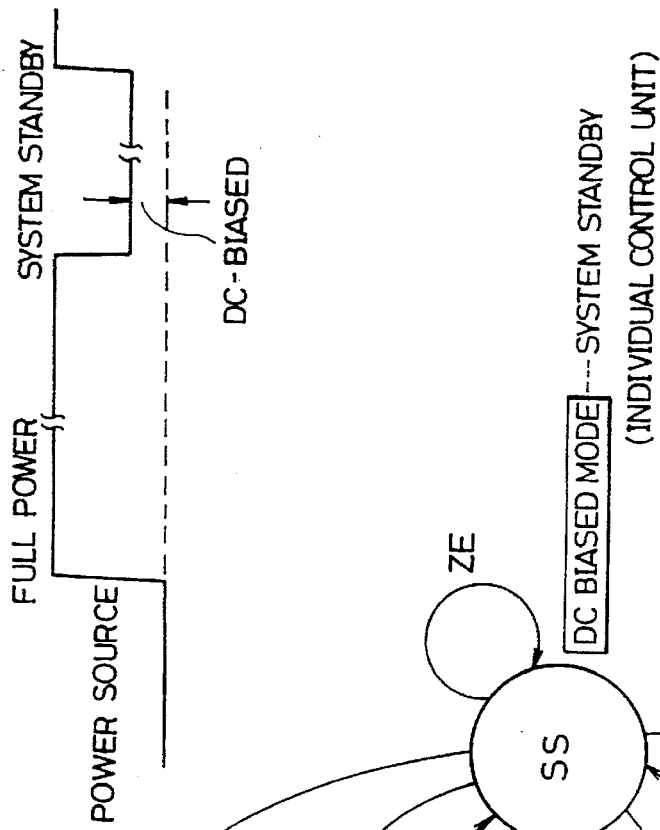
FIGS. 5A and 5B are a diagram showing the states of the power control system shown in FIG. 3.
Figure 5A:
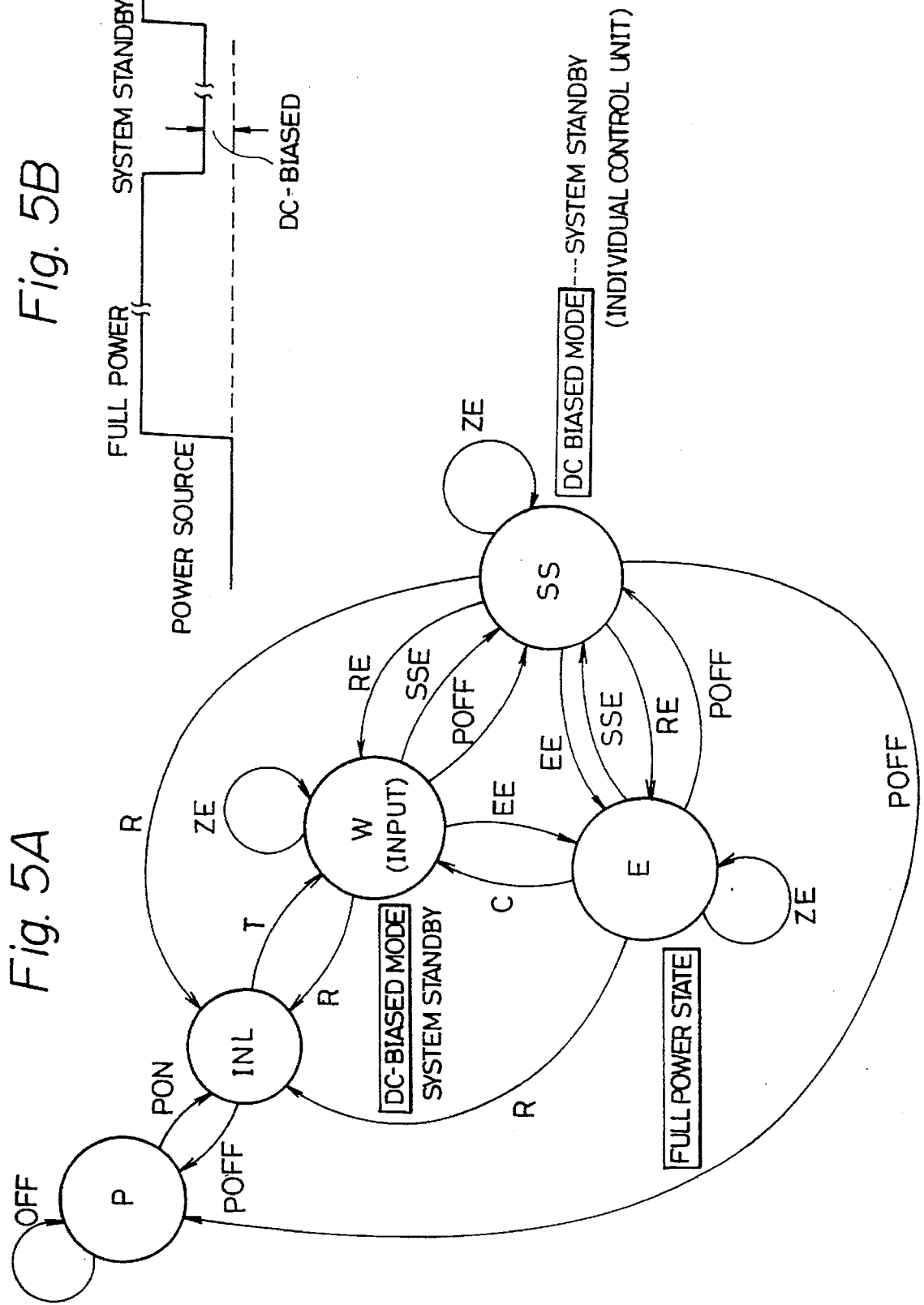

FIG. 5A and 5B shows how the state of the power management system changes. The power management system establishes the priority of interrupts occurring in the system. The priority depends on the application run in the system. The system according to this embodiment establishes the priority as follows.

Priority 1 Real-time Clock Event
Priority 2 Event of Special Key SK (state-saving or Return Key) Input
Priority 3 Timer Event
Priority 4 Communication Event
Priority 5 Direct Memory Access (DMA) Event
Priority 6 The Other Event Meanwhile, in FIGS. 5A, 5B, 11A, 11B, 14A and 14B, the following abbreviations are used;

P . . . Power
PON . . . Power On
POFF . . Power Off
INL . . . Initialize
T . . . Terminate
R . . . Reset
ZE . . . Zero Event
W . . . Waiting
RE . . . Return Event
SSE . . . State-saving Event
C . . . Complete
E . . . Executing
EE . . . Execution Event
SS . . . State-saving This embodiment does not consider the occurrence of multiple interrupts. If an interrupt stack register is provided, the distributing power management system using the private control units PR allows for the multiple interrupts.

The power management system provides an initializing state for initializing the system when powered on, a waiting state for waiting for any input or display after the system executes an operation or the like, an executing state indicating that the system is processing the data, and a wait-and-save state caused by the interrupt.

FIG. 5 shows how the state of the system changes according to each event.

For example, as described above, the real-time clock is the top priority. In a case that a timer is always displayed, the power management system has to always accept an interrupt request of the real-time clock and display it. This corresponds to the return event shown in FIG. 5. If the system is required to be inoperative when the actual time reaches a set time, it corresponds to the state-saving (wait-and-save) event shown in FIG. 5.

In the communication event, the receive request of the data takes place in asynchronous with the power management system and is normally given a higher priority. In actual, it is difficult to define the data length. Hence, it is defined as one frame. The complete receive is carried out when the power management system issues a receive request. This corresponds to a return event shown in FIG. 5.

The input event caused by pressing the special key SK is a keying event for manually causing the power management system to enter into the state-saving (wait-and-save) state or the executing state. It corresponds to the state-saving event or the return event shown in FIG. 5.

The timer event is an event on time. The event causes the display to disappear after a certain time has passed when the power management system is in the waiting state, the system to enter into the waiting state, or the system to change from the state-saving state into the waiting state.

Those state transitions are mere examples. Each application run in the system provides the corresponding events.

The overall power management system, the CPU or each I/O controller included in the system itself enables to generate a state-saving state (DC-biased mode) if the private control unit PR brings about the state-saving event.

Next, the description will be oriented to a power control circuit, the CPU, each I/O controller and each memory included in the power management system according to this embodiment.

Figure 6C:
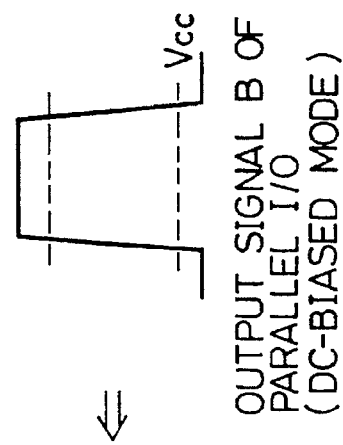
FIGS. 6A, 6B, and 6C are a block diagram showing a power control circuit included in the power management unit.
Figure 6B:
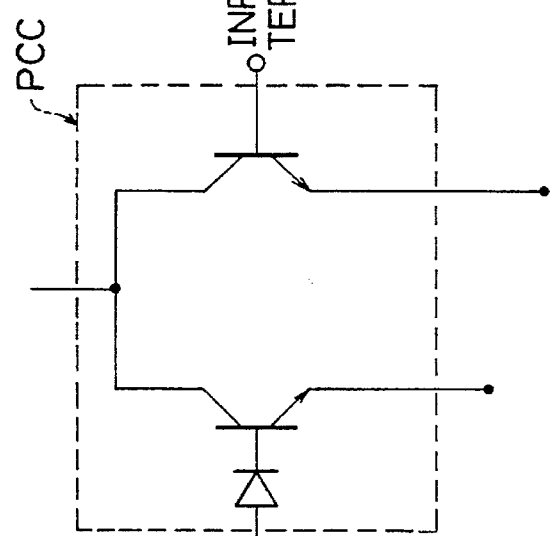
Figure 6A:
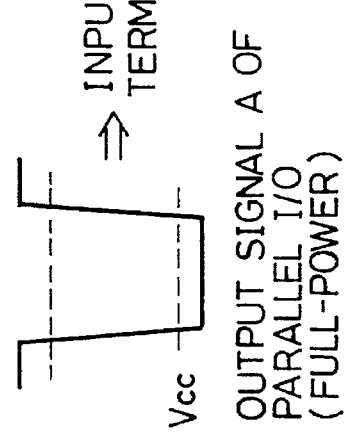

FIG. 6 shows the power control circuit PCC.

The power control circuit PCC is composed of two transistors. As shown, the parallel I/O controller supplies signals A and B at a power control port so that those signals A and B are applied to base terminals TA and TB of the transistors.

The number of used transistors depends on the application run in the system. Those transistors may be separate or integrated.

FIG. 7 shows the configuration of the power management system having the power control circuit PCC shown in FIG. 6.

As shown, the power control circuit PCC is connected to the CPU and each I/O controller, respectively. The parallel I/O controller supplies the control signals A and B from the power control port to the corresponding bases of the transistors. The control signal A is used for achieving the full power. The control signal B is used for achieving the DC-biased level. The signal A or B causes the CPU or each I/O controller to be in full power or at the DC-biased level.

The power control circuit PCC for switching the power source of the CPU or each I/O controller under the power management is allowed to be integrated within the power control unit by means of the Bi-CMOS technique.

Figure 8:
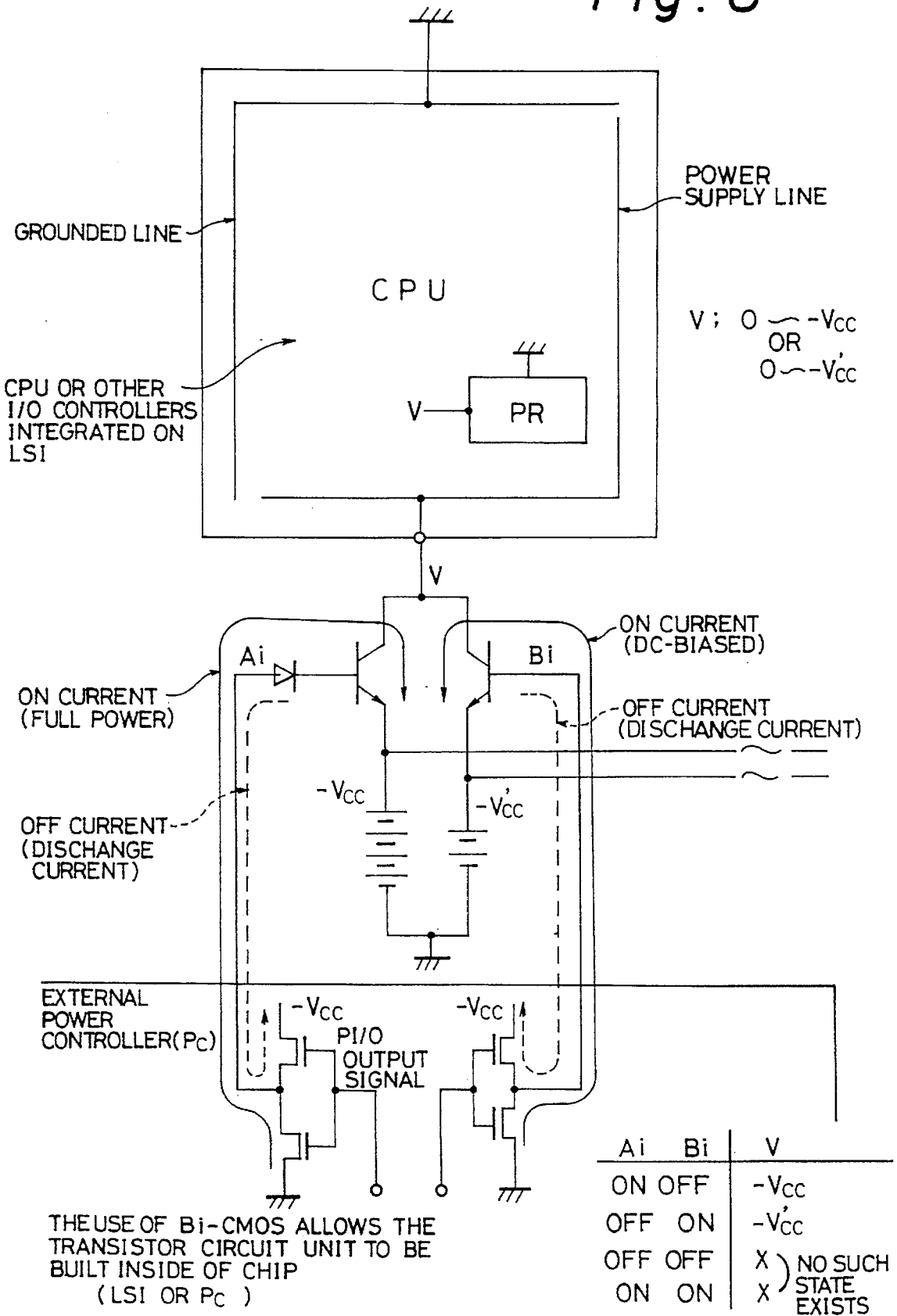
FIG. 8 is an explanatory view showing a part of a CPU included in FIG. 7.

FIG. 8 shows a concrete arrangement of the power control circuit PCC.

The power controller provided outside of the chip is connected to the terminals Ai and Bi of the PCC through a transistor circuit section included in the power controller. On current and Off current flow between the terminals Ai and Bi and the power controller in the direction as viewed in FIG. 8.

As shown in FIG. 8, each transistor is located at the terminals Ai and Bi, each of which is connected to a Bi-CMOS integrated circuit included in the power controller.

In addition, the terminals Ai and Bi shown in FIG. 8 correspond to the terminals A and B shown in FIG. 6.

Figure 9:
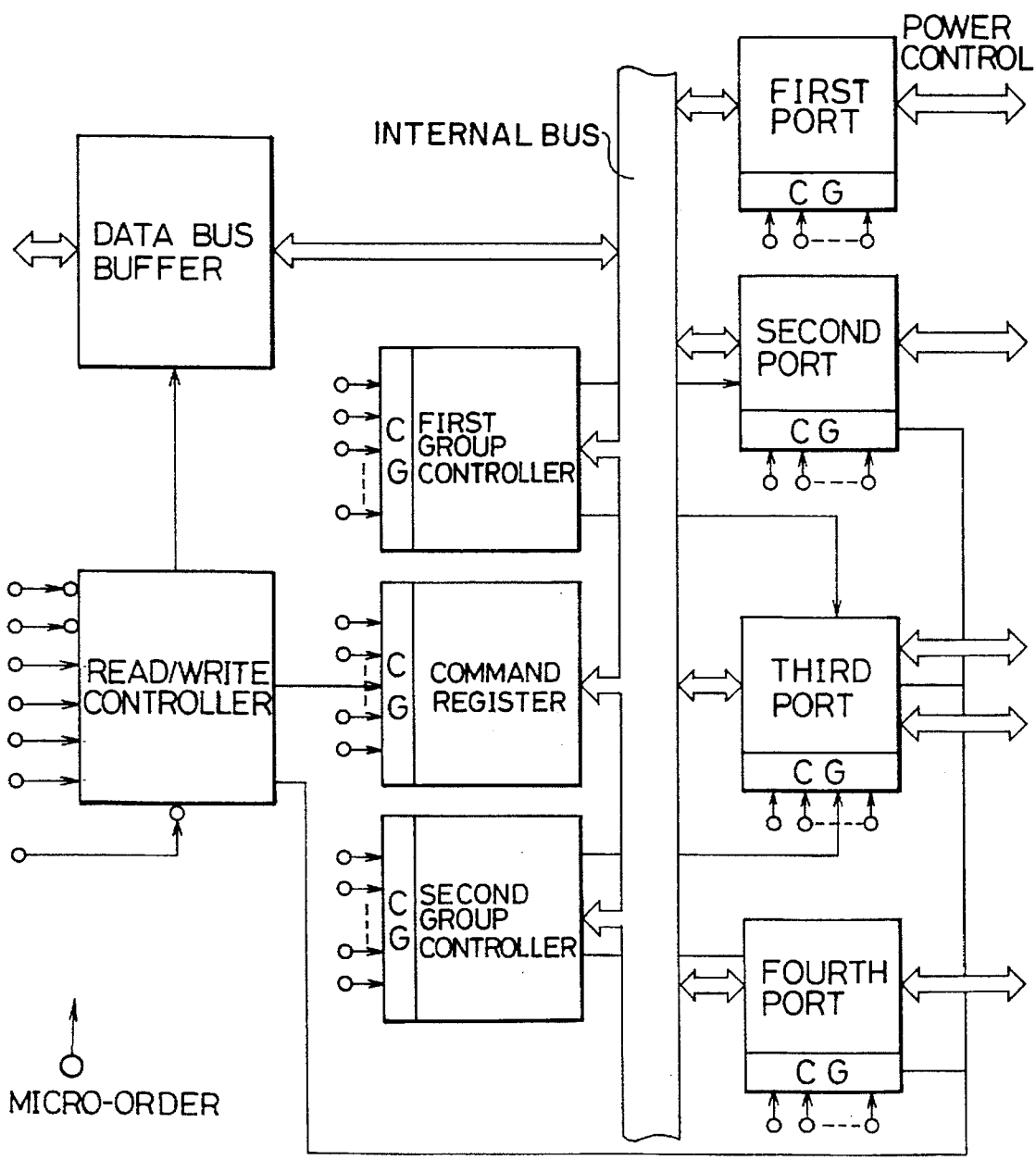
FIG. 9 is a block diagram showing a parallel I/O controller having the private control unit shown in FIG. 1.
Figure 10:
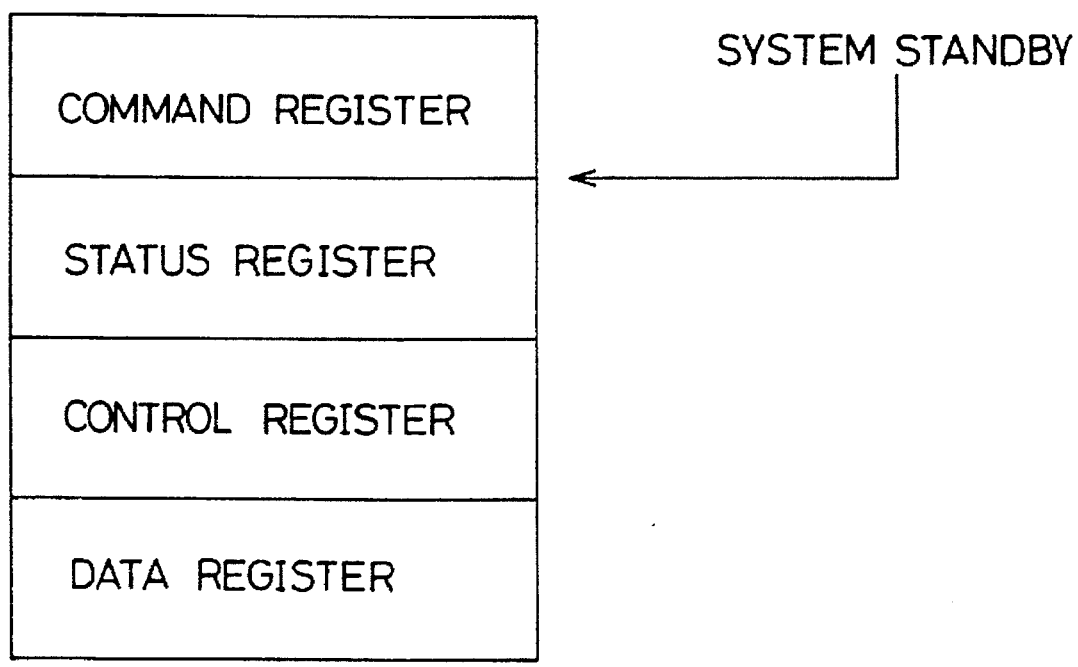
FIG. 10 is a block diagram showing a register of the private control unit included in the controller shown in FIG. 9.

FIGS. 9 and 10 shows one configuration of a parallel I/O controller having the private control unit PR.

As shown in FIG. 9, the micro-order output from the private control unit PR of the parallel I/O controller is applied to a first and a second group control units, a command register, and each control gate CG of the first to the fourth ports.

Next, the description will be oriented to the operation of each register included in the private control unit PR of the parallel I/O controller.

The instruction or data for the power management executed by the private control unit PR of the parallel I/O controller when the system is powered on are coded and applied to the command register and the data register for the purpose of executing the modes listed in the table 1 (shown below).

The status information of the power management done by the private control unit PR is applied into the status register under the control of the private control unit PR itself. The status information is coded and indicates whether or not the power management is done, the type of each mode and the execution status of each mode.

Some control values such as a set timeout value or a control value at a clock-down time are applied to the control register.

The private control unit PR of the parallel I/O controller serves to output a micro-order used for controlling each port and an I/O of each register. Further, it also outputs a micro-order for controlling a serial I/O controller and a power source of the other components rather than the parallel I/O, such as a real-time clock.

The parallel I/O controller is connected to the CPU through a bus so as to be used as a printer interface and serves to execute an I/O operation of parallel data in a programmable manner.

Figure 11:
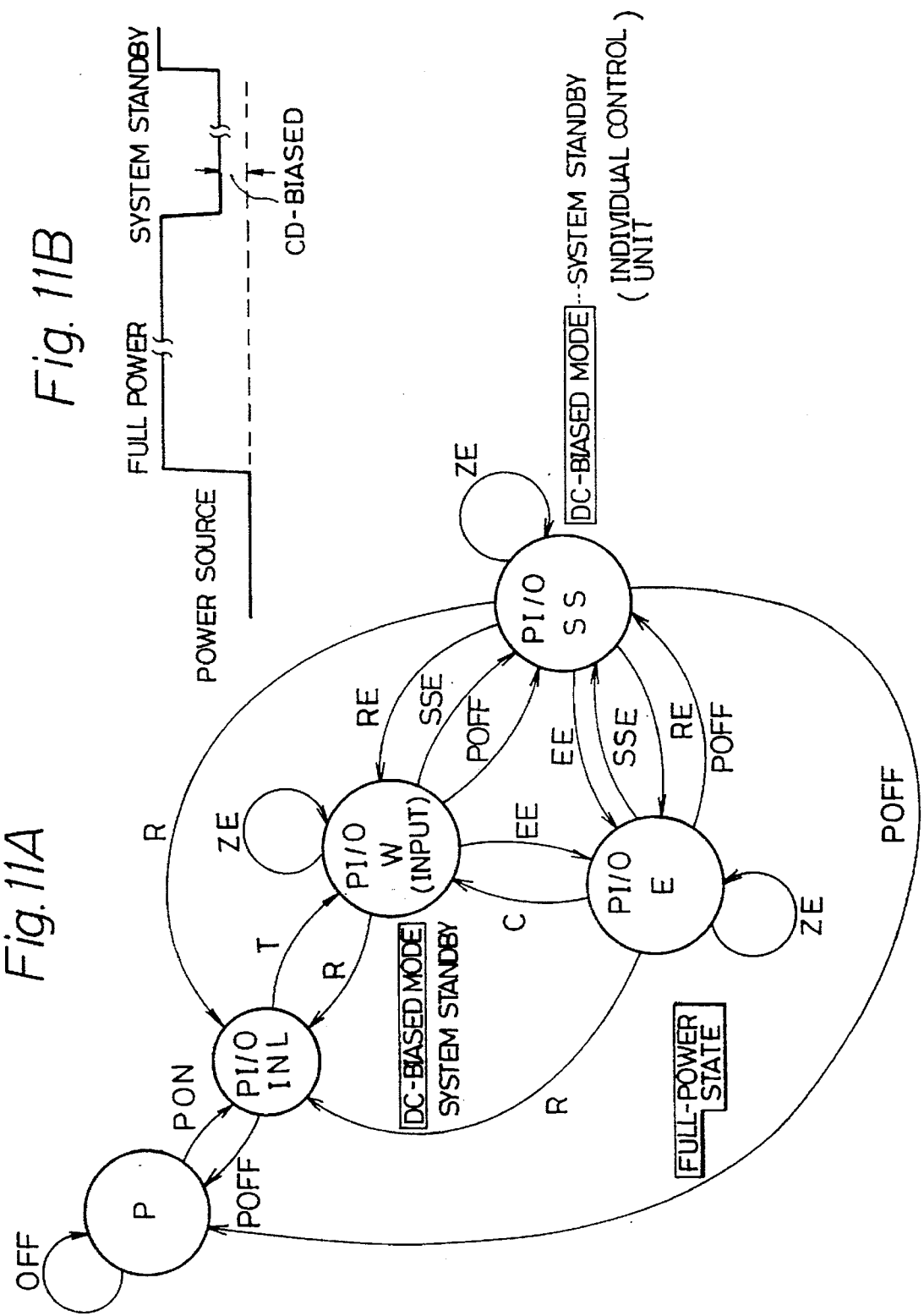
FIGS. 11A and 11B illustrate a diagram showing the states of the parallel I/O controller shown in FIGS. 9 and 10.

FIG. 11 shows how the state of the parallel I/O controller changes.

As shown in FIG. 11, the state of the parallel I/O controller is the same as that of the overall system shown in FIG. 5. However, it is different in light of time.

For example, when the system is under execution, no print output is supplied and the parallel I/O controller is in a waiting state.

Then, the physical power management modes are listed in Table 1. Those modes are logically executed in the private control unit PR of the parallel I/O controller in each state. It goes without saying that they are mere examples and depend on the application run in the system.

In the tables 1 to 10, ○ indicates the mode is fully accepted, Δ indicates the mode is partially accepted, and the X indicates the mode is not accepted by a respective controller or unit.

TABLE 1

Power Management Mode of Parallel I/O Controller
(Examples)

| | Initialize | Waiting | Execution | State-Saving | Selection Δ |
|---|---|---|---|---|---|
| Clock Down | | ○ | | | |
| Clock Stop | | Δ | | ○ | |
| Machine StateSave | | | | ○ | |
| DC-biased Mode | | Δ | | ○ | |
| Time Out | | ○ | | | |
| Power On | ○ | ○ | ○ | | |
| Power Off* | | | | ○ | |
| Display Power Off | | | | ○ | |
| Backlight Power Off | ○ | | Δ | | |

*means not physically powered off but logical powered off.

Now, each item of the Table 1 will be described.

The clock down mode has a function of lowering a clock frequency in the parallel I/O controller at several stages. The clock stop mode has a function of stopping a clock on which the parallel I/O controller operates. The machine state save mode has a function of temporarily storing the state of the parallel I/O controller. The DC-biased mode has a function of controlling the power of the parallel I/O controller to the DC-biased level (executed by the private control unit PR of the parallel I/O controller). At the timeout mode, when the actual time reaches a set time, the parallel I/O controller enters into the DC-biased mode (executed by the private control unit PR of the parallel I/O controller). The display off mode has a function of controlling the power of the display for cutting it off. The backlight power off mode is used for a liquid crystal display and has a function of cutting off the power of the backlight.

Figure 12:
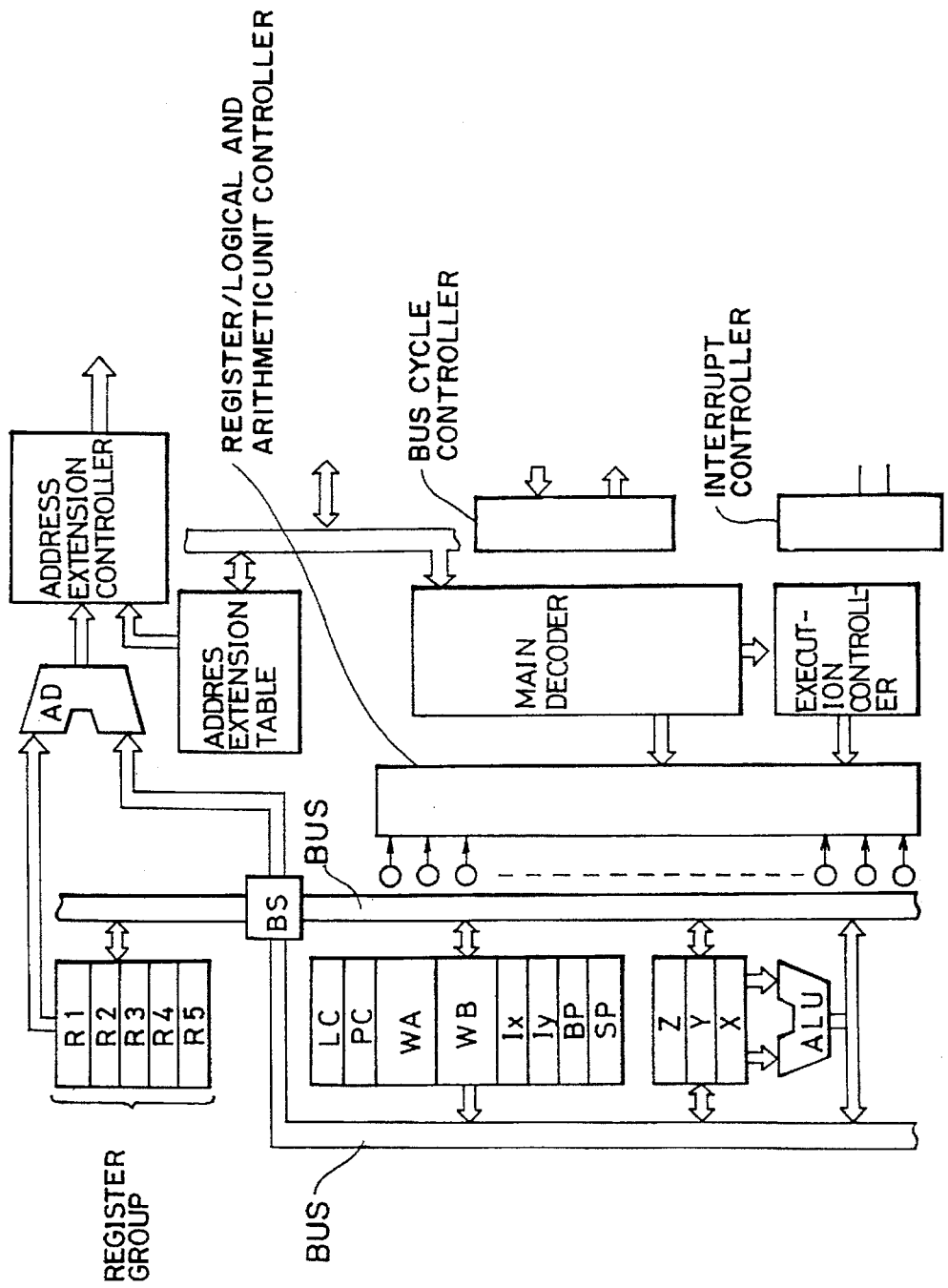
FIG. 12 is a block diagram showing a central processing unit (CPU) having the private control unit shown in FIG. 1.

FIG. 12 shows the CPU having its private control unit PR. As shown in FIG. 12, a micro-order output from the private control unit PR of the CPU is applied into a register/logic arithmetic unit controller composing the CPU itself.

Figure 13:
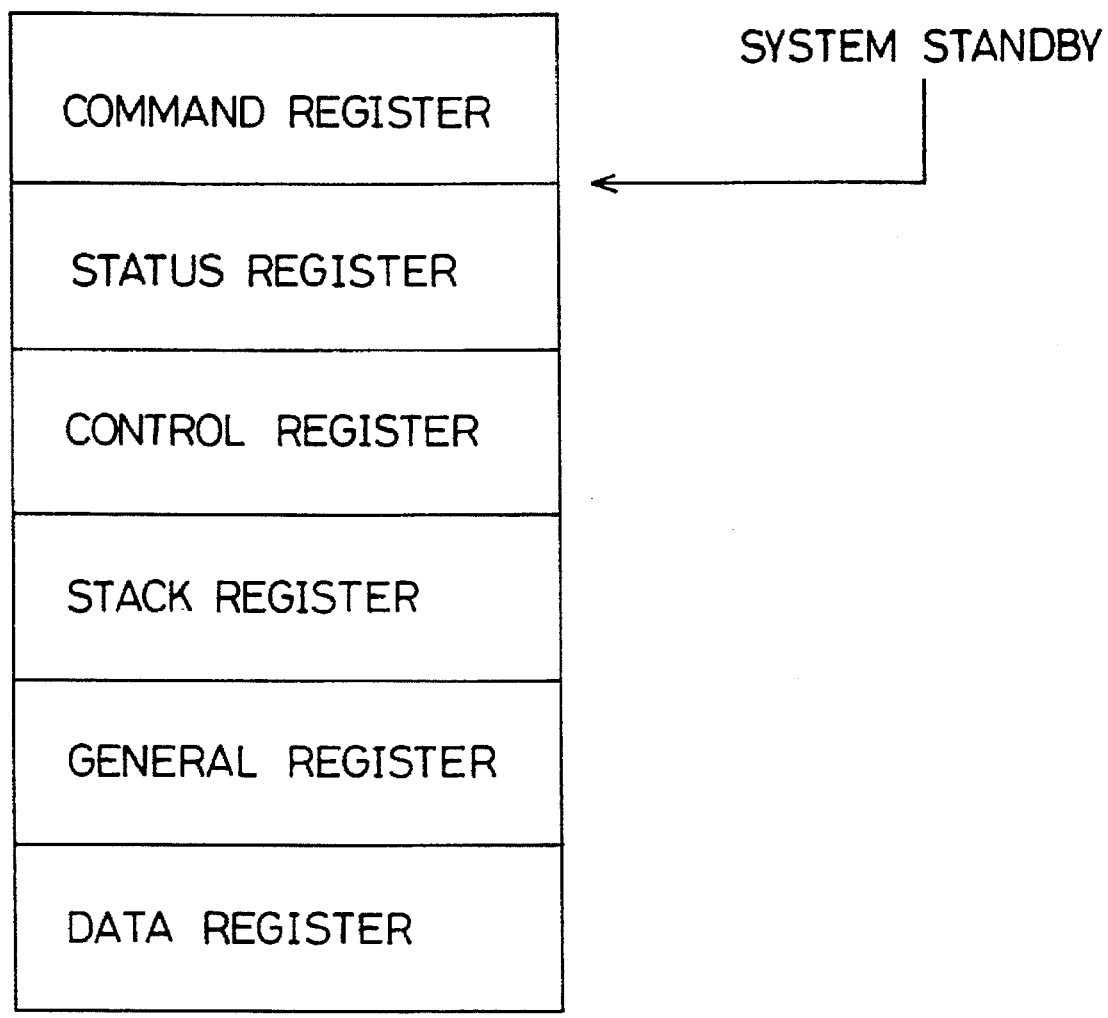
FIG. 13 is a block diagram showing a register of the private control unit included in the CPU shown in FIG. 12.

Next, the description will be oriented to the resisters included in the private control unit PR of the CPU shown in FIG. 13 (except a stack resister and a general register).

The command resister and the data resister store the instruction and the data of the power management to be executed by the private control unit PR of the CPU when the system is powered on. The stored instruction or data is coded for executing and processing the modes listed in Table 2 (to be described later).

The status register stores the information of the status power-managed by the private control unit PR. The status information is applied into the status register under the control of the PR itself. This status information contains coded data indicating whether or not the power management is executed, each mode type, and the execution status of each mode.

The control register stores a set timeout value and a control value used for the clock down mode. The micro-order input from the private control unit PR of the CPU is used for controlling an I/O operation of each register.

The power source is controlled by a request issued by the private control unit PR of the CPU to the private control unit PR of the parallel I/O controller.

The CPU provides a proper instruction group for processing the data of the overall system and operates to input or output an operation instruction, a register instruction, an address control-order and an I/O control-order through the address bus, the data bus and the control bus for the purpose of controlling the overall system.

Figure 14:
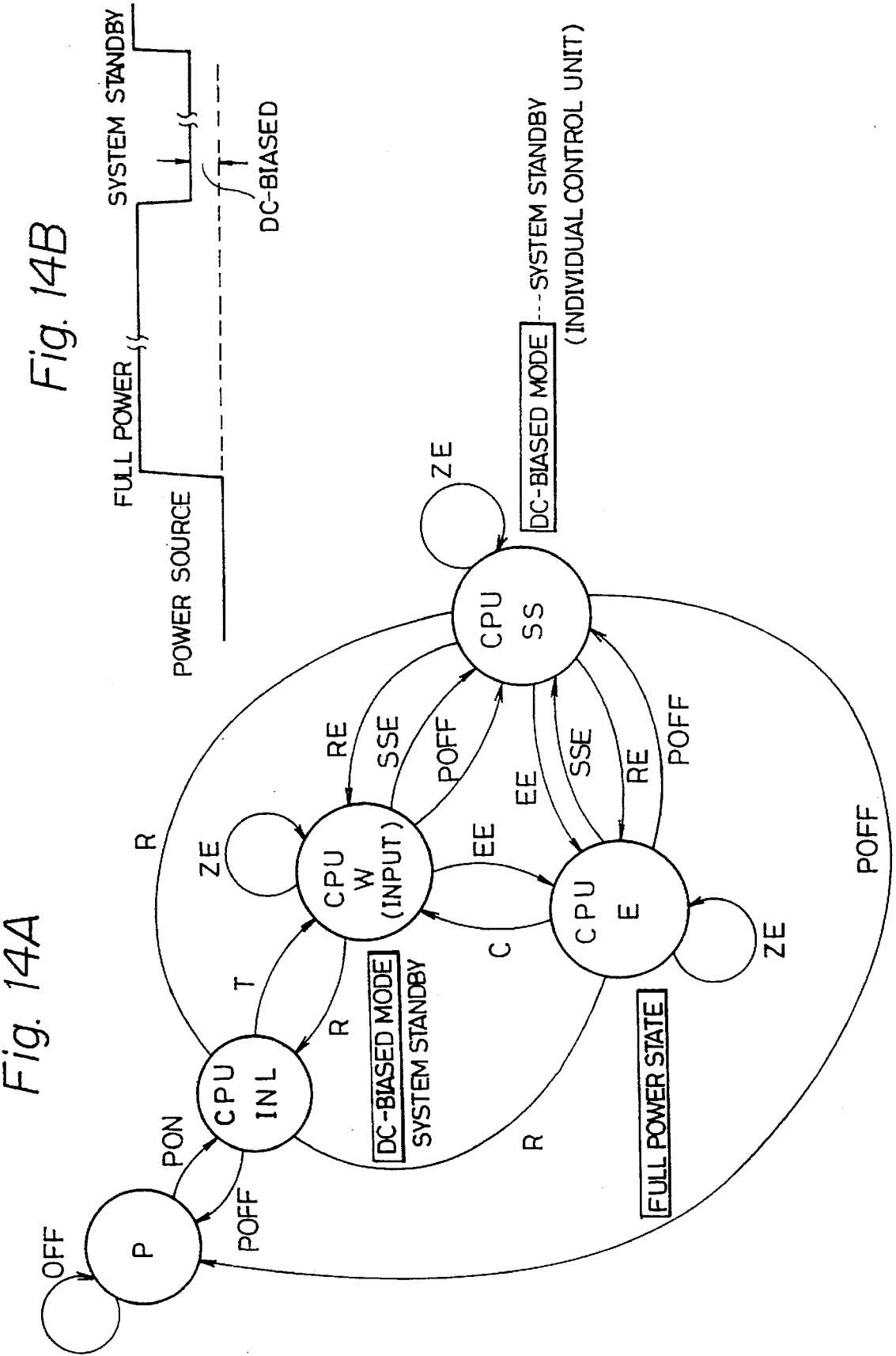
FIGS. 14A and 14B illustrate a diagram showing the states of the CPU shown in FIGS. 12 and 13.

FIG. 14 shows the change of the state of the CPU. Since the CPU operates to control the overall system, the state change shown in FIG. 14 is substantially similar to that shown in FIG. 5 but is different in terms of time. For example, when the system waits for a signal from a modem, the CPU stays in the waiting state. Some applications may cause the CPU to wait for an event from the outside of the system or a start of the I/O operation.

Then, the Table 2 lists the physical power management modes to be logically executed by the private control unit PR of the CPU in each state. Those modes depend on the application run in the system.

TABLE 2

Power Management Modes of the CPU (Examples)

| | Initialize | Waiting | Execution | State-Saving | Selection Δ |
|---|---|---|---|---|---|
| Clock Down | | O | | | |
| Clock Stop | | Δ | | O | |
| Machine StateSave | | | | O | |
| DC-biased Mode | | Δ | | O | |
| Time Out | | O | | | |
| Power On | O | O | O | | |
| Power Off* | | | | | |
| Display Power Off | | | | O | |
| Backlight Power Off | O | | Δ | | |

*means not physically powered off but logical powered off.

Now, the items listed in the Table 2 will be described below.

The clock down mode has a function of lowering a clock frequency in the CPU at several stages. The clock stop mode has a function of stopping the clock frequency in the CPU (which corresponds to the waiting state of an I/O from the external).

The machine state save mode has a function of temporarily storing the state of the CPU. For the DC-biased mode, the private control unit PR of the CPU notifies the private control unit PR of the parallel I/O controller of the fact that the CPU enters into the waiting state and controls the power of the CPU for putting it into the DC-biased level. At the timeout mode, when the actual time reaches the set value, the private control unit PR of the CPU notifies the private control unit PR of the parallel I/O controller of it and puts the CPU into the DC-biased level. At the display power off mode, the private control unit PR of the CPU requests the private control unit PR of the parallel I/O controller to control the power of the display for cutting it off. The backlight power off mode is used for a liquid crystal display. At this mode, the private control unit PR of the CPU requests the private control unit PR of the parallel I/O controller to control the power of the display for cutting it off.

Next, the description will be oriented to each I/O controller shown in FIG. 3.

Those I/O controller are generally well known. Hence, the description is oriented to each private control unit PR of each register without describing the arrangement and the operation of each I/O controller. If the flash memory is used as a file memory, it entails the provision of the flash memory controller (FMC) served as an I/O controller.

At first, the registers included in the private control unit PR of the serial I/O controller will be described below.

The command register and the data register store the instruction and the data of the power management to be executed by the private control unit PR of the serial I/O controller when the system is powered on. The stored instruction or data is coded for executing and processing the modes listed in Table 3 (to be described later).

The status register stores the information of the status power-managed by the private control unit PR. The status information is applied into the status register under the control of the PR itself. This status information contains coded data indicating whether or not the power management is executed, each mode type, and the execution status of each mode.

The control register stores a set time-out value and control values used for the clock down mode. The micro-order input from the private control unit PR of the serial I/O controller is used for controlling each communication buffer and an I/O of each register.

The power of the serial I/O controller is controlled by a request issued by the private control unit PR of the serial I/O controller to the PR of the parallel I/O controller.

The serial I/O controller is connected to the CPU through the bus and is mainly used for controlling the communication. It executes the serial communication in a synchronous or asynchronous manner under the control of the used program.

The state of the serial I/O controller is similar to that of the overall system shown in FIG. 5 but is different in terms of time. For example, even when the system is under execution, the system may often do not any communication. In this case, the serial I/O controller is in the waiting state.

Then, the Table 3 lists the physical power management modes to be logically executed by the private control unit PR of the serial I/O controller in each state. Those modes depend on the application run in the system.

TABLE 3

Power Management Modes of Serial I/O Controller (Examples)

| | Initialize | Waiting | Execution | State-Saving | Selection Δ |
|---|---|---|---|---|---|
| Clock Down | | O | | | |
| Clock Stop | | Δ | | O | |
| Machine StateSave | | | | O | |
| DC-biased Mode | | Δ | | O | |
| Time Out | | O | Δ | | |
| Power On | O | O | O | | |
| Power Off* | | | | O | |
| Display Power Off | | | | O | |
| Backlight Power Off | O | | Δ | | |

*means not physically powered off but logical powered off.

Now, those items listed in the Table 3 will be described later.

The clock down has a function of lowering a clock frequency in the serial I/O controller at several stages. The clock stop has a function of stopping the clock in the serial I/O controller. The machine-state save has a function of temporarily storing a state of the serial I/O controller. For the DC-biased mode, the private control unit PR of the serial I/O controller serves to notify the private control unit PR of the parallel I/O controller of the fact that the serial I/O controller enters into the state-saving state and control the power source of the parallel I/O controller itself so that it may enters into the DC-biased level. At the timeout mode, when the actual time reaches the set time, the private control unit PR of the serial I/O controller notifies the private control unit PR of the parallel I/O controller of it and puts the serial I/O controller into the DC-biased level.

During the communication, the timeout may takes place even when the power management is executed. For example, a case may happen where a caller cannot connect the called. To overcome this condition, the display power off mode is activated so that the private control unit PR of the serial I/O controller may request the private control unit PR of the parallel I/O controller to control the power of the display for cutting it off. The backlight power off mode is used for the liquid crystal display. The mode is activated so that the private control unit PR of the serial I/O controller may request the private control unit PR of the parallel I/O controller to control the power of the backlight for cutting it off.

Next, the description will be oriented to the registers included in the private control unit PR of the real-time clock (RTC) controller.

The command register and the data register store the instruction and the data of the power management to be executed by the private control unit PR of the RTC controller when the system is powered on. The stored instruction or data is coded for executing and processing the modes listed in Table 4 (to be described later).

The status register stores the information of the status power-managed by the private control unit PR. The status information is applied into the status register under the control of the PR itself. This status information is coded ad indicates whether or not the power management is executed, each mode type and the execution status of each mode.

The control register stores a set time-out value and control values used for the clock down mode. The micro-order applied from the private control unit PR into the RTC controller is used for controlling an I/O operation of each register.

The power source is controlled by a request issued from the private control unit PR of the RTC controller into the PR of the parallel I/O controller.

The RTC controller takes an interface with the CPU (in some cases, the bus connection is not established). It is more independent rather than the other I/O controllers and functions as a watch.

The watch continues its operation whatever state the system stays in. The other components except the watch are changed as the power management system changes. That is, if the RTC controller operates as a watch, no change takes place in the RTC controller.

The state of the RTC controller is similar to the state of the overall system shown in FIG. 5. However, the RTC controller changes in a different way in terms of time. For example, when the system is being executed, it may often issue no real-time interrupt, that is, enter into a waiting state except the watch portion.

The Table 4 lists the physical power management modes to be logically executed by the private control unit PR of the RTC controller when the system stays in each state.

Those modes depend on the application run in the system. However, the clock is always in an operation.

TABLE 4

Power Management Modes of RTC Parallel I/O Controller (Examples)

| | Initialize | Waiting | Execution | State-Saving | Selection Δ |
|---|---|---|---|---|---|
| Clock Down | | O | | | |
| Clock Stop | | Δ | | (O) | |
| Machine StateSave | | | | O | |
| DC-biased Mode | | Δ | | O | |
| Time Out | | O | | | |
| Power On | O | O | O | | |
| Power Off* | | | | O | |
| Display Power Off | | | | O | |
| Backlight Power Off | O | | Δ | | |

*means not physically powered off but logical powered off.

Then, the items listed in Table 4 will be described.

The clock down mode has a function of lowering a clock frequency in the RTC controller at several stages except the clock (32.768 KHZ) on which the watch portion operates. The clock stop mode has a function of stopping the clock in the RTC controller except the clock of the watch. The machine-state saving mode has a function of temporarily storing the state of the RTC controller. For the PC-biased mode, the private control unit PR of the RTC controller notifies the private control unit PR of the parallel I/O controller of the fact that the RTC controller enters into the state-saving state and control the power source of the RTC controller into the DC-biased level. At the timeout mode, when the actual time reaches the set time, the private control unit PR of the RTC controller notifies the private control unit PR of the parallel I/O controller of it and puts the RTC controller into the DC-biased level. At the display power off, when the actual time reaches the set time, the private control unit PR of the RTC controller requests the private control unit PR of the parallel I/O controller to control the power of the display for cutting it off. The backlight off mode is used for a liquid crystal display. When the actual time reaches the st time, the private control unit PR of the RTC controller request the private control unit PR of the parallel I/O controller to control the power of the backlight for cutting it off.

Next, the description will be oriented to the registers included in the private control unit PR of the counter timer controller (CTC).

The command register and the data register store the instruction and the data of the power management to be executed by the private control unit PR of the CTC when the system is powered on. The stored instruction or data is coded for executing and processing the modes listed in Table 5.

The status register stores the information of the status power-managed by the private control unit PR. The status information is applied into the status register under the control of the PR itself. This status information contains coded data indicating whether or not the power management is executed, each mode type, and the execution status of each mode.

The control register stores a counter value and control values used for the clock down mode. A micro-order applied from the private control unit PR into the CTC is used for controlling an I/O of each register or counter. The power source is controlled by a request issued by the private control unit PR of the CTC to the private control unit PR of the parallel I/O controller.

The CTC is connected with the CPU bus and is used for controlling the timing of the system. It operates as a programmable refresh counter of a dynamic random access memory (D-RAM).

The change of the CTC state is similar to that of the overall system shown in FIG. 5. However, the CTC changes in a different way in terms of time.

For example, even when the system stays in the waiting or saving state, the counter keeps to operate to control the timing of the system. In this state, the refresh operation of the D-RAM is executed as the clock-down state for the power management.

Next, the table 5 lists the physical power management modes to be logically executed by the private control unit PR of the CTC in each state. Those modes depend on the application run in the system.

TABLE 5

Power Management Modes of CTC
(Examples)

|  | Initialize | Waiting | Execution | State-Saving | Selection Δ |
|---|---|---|---|---|---|
| Clock Down |  | O |  |  |  |
| Clock Stop |  | Δ |  | (O) |  |
| Machine StateSave |  |  |  | O |  |
| DC-biased Mode |  | X |  | X |  |
| Time Out |  | O |  |  |  |
| Power On | O | O | O |  |  |
| Power Off* |  |  |  | O |  |
| Display Power Off |  |  |  | O |  |
| Backlight Power Off | O |  | Δ |  |  |

*means not physically powered off but logical powered off.

The items listed in Table 5 will be described below.

The clock down mode has a function of lowering a clock frequency in the CTC at several stages. The refresh of the D-RAM is executed at the lowered clock frequency. The clock stop mode has a function of stopping the clock in the CTC except the refresh counter of the D-RAM. The machine-state saving mode has a function of temporarily storing the state of the CTC. The DC-biased mode is not allowed to be set, because the CTC operates to control the timing of the system. The timeout mode corresponds to the DC-biased mode in the CTC. Hence, it is not allowed to be set. However, if the system enters into the timeout mode (for example, the timeout appearing when it is waiting), the timeout mode is allowed. At the display power off, when the actual count value reaches the set value, the private control unit PR of the CTC issues a request for cutting off the power of the display to the private control unit PR of the parallel I/O controller. The backlight off mode is used for a liquid crystal display. When the actual count value reaches the set value, the private control unit PR of the CTC issues a request for cutting off the power of the display to the private control unit PR of the parallel I/O controller.

In the following, the description will be oriented to the registers included in the private control unit PR of the interrupt controller (INTC).

The command register and the data register store the instruction and the data of the power management to be executed by the INTC when the system is powered on. The stored instruction or data is coded for executing and processing the modes listed in Table 6.

The status register stores the information of the status power-managed by the private control unit PR. The status information is applied into the status register under the control of the PR itself. This status information contains coded data indicating whether or not the power management is executed, each mode type and the execution status of each mode. The control register stores a control value given when the clock frequency is lowered. A micro-order applied from the private control unit PR of the INTC is used for controlling an I/O of each register. The power source of the INTC is controlled by a request issued by the private control unit PR of the INTC to the PR of the parallel I/O controller.

The INTC is connected to the CPU through a bus and enables to programmable control an interrupt. The INTC processes an interrupt input signal with a priority given thereto and notifies the CPU of the interrupt request.

The change of the state of the INTC is similar to that of the overall system shown in FIG. 5 but is different in terms of time.

For example, even when the system is under execution, the INTC may be in the waiting state. Since the INTC starts to operate in response to the interrupt issued by the system, the INTC keeps the waiting state if no interrupt is provided.

The interrupt events done by the special key SK are non-maskable interrupts and contain several kinds of interrupts.

The Table 6 lists the physical power management modes of the INTC to be logically executed by the private control unit PR of the INTC in each state. Those modes depend on the application run in the system.

TABLE 6

Power Management Modes of INTC
(Examples)

|  | Initialize | Waiting | Execution | State-Saving | Selection Δ |
|---|---|---|---|---|---|
| Clock Down |  | O |  |  |  |
| Clock Stop |  | Δ |  | O |  |
| Machine StateSave |  |  | O | O |  |
| DC-biased Mode |  | Δ |  | O |  |
| Time Out |  | X | Δ |  |  |
| Power On | O | O | O |  |  |
| Power Off* |  |  |  | O |  |
| Display Power Off |  |  |  | O |  |
| Backlight Power Off | O |  | Δ |  |  |

*means not physically powered off but logical powered off.

Now, those items of the Table 6 will be described below.

The clock down mode has a function of lowering a clock frequency at several stages. The clock stop mode has a function of stopping the clock in the INTC. The machine state saving mode has a function of temporarily storing the state of the INTC. At the DC-biased mode, the private control unit PR of the INTC notifies the PR of the CPU of the occurrence of an interrupt in the system. However, if the interrupt is an event of putting the INTC into the state-saving state, the PR of the INTC notifies the PR of the parallel I/O control of it before putting itself into the DC-biased level. If not, the CPU serves to process an interrupt. At the timeout mode, though the INTC provides no timer function, the INTC can accept an interrupt given on the timeout function of the system. In this case, the private control unit PR of the INTC notifies the PR of the CPU of it. If the interrupt is an event of putting the INTC into the state-saving state, the private control unit PR of the INTC notifies the PR of the parallel I/O controller of it and then the INTC enters into the DC-biased mode. At the display power off mode, the private control unit PR of the INTC requests the PR of the parallel I/O controller to control the power of the display for cutting it off. The backlight power off mode is used for a liquid crystal display. At this mode, the private control unit PR of the INTC requests the PR of the parallel I/O controller to control the power of the backlight for cutting it off.

Next, the description will be oriented to the registers included in the private control unit PR of a direct memory access controller (DMAC).

The command register and the data register store the instruction and the data of the power management to be executed by the DMAC when the system is powered on. The stored instruction or data is coded for executing and processing the modes listed in Table 7.

The status register stores the information of the status power-managed by the private control unit PR. The status information is applied into the status register under the control of the PR itself. This status information contains coded data indicating whether or not the power management is executed, each mode type and the execution status of each mode. The control register stores a control value given when the clock frequency is lowered. A micro-order applied from the private control unit PR of the DMAC is used for controlling an I/O of each register. The power source of the DMAC is controlled by a request issued by the private control unit PR of the INTC to the PR of the parallel I/O controller.

The DMAC is connected to the CPU through a bus. It is a controller which enables to directly access each I/O controller (for example, a flash memory connected outside) without through the CPU. This is used for transferring the stored data or reading/writing the data to/from an external storage unit.

The change of the state of the DMAC is similar to that of the overall system shown in FIG. 5 but is different in terms of time. For example, even when the system is under execution, the DMAC may be in the waiting state. In response to a request for the DMA given to the system, the transfer of the stored data or the I/O data is executed. If no request for the DMA is given, therefore, the DMAC is in the waiting state.

Next, the Table 7 lists the physical power management modes to be logically executed by the private control unit PR of the DMAC in each state. Those modes depend on the application run in the system.

TABLE 7

Power Management Modes of DMAC
(Examples)

|  | Initialize | Waiting | Execution | State-Saving | Selection Δ |
|---|---|---|---|---|---|
| Clock Down |  | Δ |  |  |  |
| Clock Stop |  | O |  | O |  |
| Machine StateSave |  |  |  | O |  |
| DC-biased Mode |  | Δ |  | O |  |
| Time Out |  | X |  |  |  |
| Power On | O | O | O |  |  |
| Power Off* |  |  |  | O |  |
| Display Power Off |  |  |  | O |  |
| Backlight Power Off | O |  | Δ |  |  |

*means not physically powered off but logical powered off.

Now, those items listed in Table 7 will be described later.

The clock down mode has a function of lowering a clock frequency in the DMAC as several stages. The clock stop mode has a function of stopping the clock frequency in the DMAC. The machine state save mode has a function of temporarily storing the state of the DMAC. For the DC-biased mode, the private control unit PR of the DMAC notifies the PR of the parallel I/O controller of the fact the DMAC enters into the state-saving state and controls the power of the DMAC for putting the DMAC into the DC-biased level. At the timeout mode, though the DMAC provides no timer function, if a state-saving event using the timer function is provided in the system, the private control unit PR of the DMAC notifies the PR of the parallel I/O controller of the event and putting the DMAC into the DC-biased mode. At the display power off mode, the private control unit PR of the DMAC requests the PR of the parallel I/O controller to control the power of the display for cutting it off. The backlight power off mode is used for a liquid crystal. At this mode, the private control unit PR of the DAMC requests the PR of the parallel I/O controller to control the power of the backlight for cutting it off.

Next, the description will be oriented to the registers included in the private control unit PR of the flash memory controller (FMC).

The flash memory controlled by the FMC consumes power in operation but does not consume the power when it is inoperative. It enables to hold the stored data without having to feed power. Hence, the power fed to the memory may be cut off at any time (it may be physically cut off when it is inoperative). In addition to the modes listed in Table 8 (to be described later), a flash memory power off mode is provided. At this mode, the status register indicates that the private control unit PR of the FMC is inoperative. Hence, the private control unit PR of the FMC notifies the PR of the parallel I/O controller of the fact that it is inoperative and cuts off the power of an external memory.

The command register and the data register store the instruction and the data of the power management to be executed by the DMAC when the system is powered on. The stored instruction or data is coded for executing and processing the modes listed in Table 8.

The status register stores the information of the status power-managed by the private control unit PR. The status information is applied into the status register under the control of the PR itself. This status information contains coded data indicating whether or not the power management is executed, each mode type, and the execution status of each mode. The control register stores a control value given when the clock frequency is down. A micro-order applied from the private control unit PR of the FMC is used for controlling an I/O of each register.

The power is controlled by a request issued by the private control unit PR of the FMC to the PR of the parallel I/O controller.

The FMC is connected to the CPU through a bus so that the FNIC may transfer the data at a byte unit, a word unit or a block unit (for example, 512B) and read or write the data from or into the external memory. It operates as a file controller for treating the external memory as a file.

The change of the state of the FMC is similar to that of the overall system as shown in FIG. 5 but is different in terms of time. For example, even when the system is under execution, the FMC may be in the waiting state. Concretely, the system issues a request for reading or writing data to an external memory for reading or writing the data to or from the external memory. Hence, the FMC is in the waiting state if no reading or writing request is issued.

The Table 8 lists the physical power management modes to be logically executed by the private control unit PR of the FMC in each state. Those modes depend on the application run in the system.

TABLE 8

Power Management Modes of FMC
(Examples)

|  | Initialize | Waiting | Execution | State-Saving | Selection Δ |
|---|---|---|---|---|---|
| Clock Down |  | Δ |  |  |  |
| Clock Stop |  | O |  | O |  |
| Machine StateSave |  |  |  | O |  |

TABLE 8-continued

Power Management Modes of FMC
(Examples)

|  | Initialize | Waiting | Execution | State-Saving | Selection Δ |
|---|---|---|---|---|---|
| DC-biased Mode |  | Δ |  | O |  |
| Time Out |  | X |  |  |  |
| Power On | O | O | O |  |  |
| Power Off* |  |  |  | O |  |
| Display Power Off |  |  |  | O |  |
| Backlight Power Off | O |  | Δ |  |  |

*means not physically powered off but logical powered off.

The items listed in the Table 8 will be described later.

The clock down mode has a function of lowering a clock frequency at several stages. The clock stop mode has a function of stopping the clock. The machine state save mode has a function of temporarily storing the state of the FMC. For the DC-biased mode, the private control unit PR of the FMC notifies the PR of the parallel I/O controller of the fact that the FMC enters into the state-saving state and controls the power of the FMC for putting it into the DC-biased mode. At the timeout mode, though the FMC has no timer function, if the state-saving event using the timer is provided in the system, the private control unit PR of the FMC notifies the PR of the parallel I/O controller of it and putting the FMC into the DC-biased level. At the display power off mode, the private control unit PR of the FMC requests the PR of the parallel I/O controller to control the power of the display for cutting it off. The backlight power off mode is used for a liquid crystal display. At this mode, the private control unit PR of the FMC requests the PR of the parallel I/O controller to control the power of the backlight for cutting it off.

In the following, the direction will be oriented to the resisters included in the private control unit PR of the video data controller (VDC).

The command register and the data register store the instruction and the data of the power management to be executed by the VDC when the system is powered on. The stored instruction or data is coded for executing and processing the modes listed in Table 9.

The status register stores the information of the status power-managed by the private control unit PR. The status information is applied into the status register under the control of the PR itself. This status information contains coded data indicating whether or not the power management is executed, each mode type, and the execution status of each mode.

The control register stores a control value given when the clock is down. A micro-order applied from the individual control unit PR of the VDC is sent to a drawing address controller or a display address controller or used for controlling an I/O operation of a video data controller.

The power is controlled by a request issued by the private control unit PR of the VDC to the PR of the parallel I/O controller.

The VDC is connected to the CPU through a bus and operates as a controller for controlling the video data such as selection of drawing timing, drawing of a line, an arc, a square or a character, scrolling, and automatic movement of a cursor.

Further, a local bus is connected to a video RAM (referred to as a V-RAM) for controlling the bit data stored in the V-RAM. To consider the use of the D-RAM, the V-RAM provides a refresh function of the D-RAM.

In place of the D-RAM, it is possible to a pseudo self-refresh RAM (pseudo S-RAM) which does not need to be refreshed.

The VDC takes an interface with the CRT or used as a liquid crystal display controller (referred to as an LCDC). In the latter case, the VDC is connected to an LCD flat display. Hence, it contains a data interface converter for activating the LCD. The description about the control of the video data is removed, because any video data is allowed to be controlled by the same control function.

The change of the state of the VDC is similar to that of the overall system shown in FIG. 5 but is different in terms of time. For example, even when the system is under execution, the VDC may be in the waiting state. While the system is processing data (executing the arithmetic operation or accessing a file), the VDC does not need to be operative. The VDC just starts to be operative after terminating the data processing.

Table 9 lists the physical power management modes to be logically executed by the private control unit PR of the VDC in each state. Those modes depend on the application run in the system.

TABLE 9

Power Management Modes of VDE
(Examples)

|  | Initialize | Waiting | Execution | State-Saving | Selection Δ |
|---|---|---|---|---|---|
| Clock Down |  | Δ |  |  |  |
| Clock Stop |  | X |  | (O) |  |
| Machine StateSave |  |  |  | O |  |
| DC-biased Mode |  | Δ |  | O |  |
| Time Out |  | X |  |  |  |
| Power On | O | O | O |  |  |
| Power Off* |  |  |  | O |  |
| Display Power Off |  |  |  |  |  |
| Backlight Power Off | O |  | Δ |  |  |

*means not physically powered off but logical powered off.

Those modes listed in Table 9 will be described below.

The clock down mode has a function of lowering a clock frequency at several stages. The clock atop mode has a function of stopping the clock in the VDC. If the D-RAM is used as a V-RAM, the clock stop mode is not provided. That is, if the S-RAM or the pseudo S-RAM is used, at this mode, the clock is allowed to be stopped. The machine state save mode has a function of temporarily storing the state of the VDC. For the DC-biased mode, the private control unit PR of the VDC notifies the PR of the parallel I/O controller of the fact that the VDC enters into the state-saving state and controls the power of the VDC for putting the VDC into the DC-biased level. At the timeout mode, though the VDC has no timer function, if the state-saving event using the timer is provided in the system, the private control unit PR of the VDC notifies the PR of the parallel I/O controller of it and putting the VDC into the DC-biased level. At the display power off mode, the private control unit PR of the VDC requests the PR of the parallel I/O controller to control the power of the display for cutting it off. The backlight power off mode is used for a liquid crystal display. At this mode, the private control unit PR of the VDC requests the PR of the parallel I/O controller to control the power of the backlight for cutting it off.

Next, the description will be oriented to the registers included in the private control unit PR of a keyboard controller (KBC (serial I/O(II) controller)) having its private control unit PR.

The command register and the data register store the instruction and the data of the power management to be executed by the KBC when the system is powered on. The stored instruction or data is coded for executing and processing the modes listed in Table 10.

The status register stores the information of the status power-managed by the private control unit PR. The status information is applied into the status register under the control of the PR itself. This status information contains coded data indicating whether or not the power management is executed, each mode type and the execution status of each mode.

The control register stores a control value given when the clock is down. A micro-order input to the KBC is used for controlling an I/O of these registers or the like.

To control the power source, the private control unit PR of the KBC issues a request for controlling the power to the PR of the parallel I/O controller through the PR of the serial I/O (II) controller.

The serial I/O (II) controller is constantly synchronous with and takes a serial interface with the KBC so that it may notify the KBC of a key input and process the input data. The private control unit PR of the serial I/O (II) controller operates to execute the modes listed in Table 10 under the control of the PR of the KBC.

As shown in FIG. 3, KBC is not connected to the bus so that KBC may synchronize a signal input from the keyboard in an independent, that is, asynchronous manner with the operating frequency of the system and serve as a controller for coding input data such as characters, symbols and numerical values. For the KBC, a microcomputer unit having a ROM, a RAM and an I/O port built therein may be often used. In the system shown in FIG. 3, the KBC is connected to the serial I/O (II) in a manner that the serial I/O (II) may change in the same manner as the KBC. The serial I/O (II) unit takes an interface of a serial signal from the KBC with the system signal.

The change of the KBC is the same as the change of the overall system shown in FIG. 5. It is quite different on time from the change of the system having another I/O controller. For example, while the system is under execution, the KBC is waiting for almost of the execution time of the system. When continuous key inputs are given to the KBC, the KBC has a relatively larger number of accesses to the system.

If, however, a key input has a high interrupt priority, the system always accepts the key input (except a real-time clock). If it is a saving event, the system changes to a saving state or if it is a returning event, the system changes to a returning event.

In turn, Table 10 lists the physical power management modes to be logically executed by the private control unit PR of the KBC in each state of the system. Those modes depend on the application run in the system.

TABLE 10

Power Management Modes of KBC(SI/O II) (Examples)

| | Initialize | Waiting | Execution | State-Saving | Selection Δ |
|---|---|---|---|---|---|
| Clock Down | | O | | Δ | |
| Clock Stop | | Δ | | O | |
| Machine StateSave | | | | O | |
| DC-biased Mode | | X | | X | |
| Time Out | | X | | | |
| Power On | O | O | O | | |
| Power Off* | | | | X | |
| Display Power Off | | | | O | |
| Backlight Power Off | O | | | | |

*means not physically powered off but logical powered off.

Those modes listed in Table 10 will be described below.

The clock down mode has a function of lowering a clock frequency inside of the KBC at several stages. The clock stop mode has a function of stopping the clock in the KBC. The machine State Save has a function of temporarily storing the inside of the KBC. In the KBC, the DC-biased mode is not set, because the KBC needs to notify the system of the asynchronous key input and always accept the special key SK. However, depending on a system application, there is a system which accepts the key input only in the waiting state, for such a case, the DC-biased mode is enabled to be set. The timeout is not set as well, because the KBC needs to process the asynchronous key input. After a certain length of time passes (practically, some minutes), the individual control PR of another I/O controller may issue a timeout request to the KBC, so that the KBC may enter into the timeout. At the display power off, the private control unit PR of the KBC requests the private control unit PR of the parallel I/O controller to control a display power for cutting it off. At the backlight power off, if the LCD is used, the private control unit PR of the KB requests the private control unit PR of the parallel I/O controller to control the power source of the backlight for cutting it off.

Next, each memory in the system will be described below.

The system employs a D-RAM as a main memory. lots of S-RAMs are used depending on the scale of the system, because the S-RAM does not consume so high power and enables to statically store data. In the system using the D-RAM as a main system, the refresh operation has to be done for a constant time in light of the characteristic of the D-RAM. It means that no DC-biased mode is set. But, the clock down mode can be set by the CTC.

On the other hand, the S-RAM has a function of statically storing data. It may provide the DC-biased mode. That is, when the parallel I/O controller enters into the saving state, the PR of the parallel I/O controls the power source of the S-RAM (main memory) so that the system may be set as the DC-biased mode. If the pseudo S-RAM is used as a main memory, it is self-refreshed. It means that no DC-biased mode is set like the D-RAM.

The IC memory card uses a variety of memories. Those memories are, in large, divided into ROMs and RAMs. The ROMs includes a M-RAM (Mask ROM), an EP-ROM, an EEPROM and all the other ROMs. The ROMs enables to store data when the memory power is cut off. It means that the DC-biased mode may be set. Hence, the ROMs are physically powered off. It means that the power off mode may be set.

On the other hand, the RAMs include a D-RAM, an S-RAM and a pseudo S-RAM. The D-RAM is unpractical to the IC memory card, because the IC memory card is mounted to the main body when it is used, or is removed from the main body when it is not used. As described with respect to the main memory, if the IC memory card employs the S-RAM, the IC memory card may provide the PC-biased mode so that the individual control PR of the parallel I/O controller may control the power source. If it employs the pseudo S-RAM, the pseudo S-RAM provides a self-refresh function. Hence, when it is removed or mounted to the main body, the pseudo S-RAM can hold data if it is fully powered. However, it does not provide the PC-biased mode, because it is unpractical in the pseudo S-RAM like the D-RAM.

When the integrated circuit becomes more dense in future, the overall system may be integrated on one chip. In this case, this power management system enables to control the power sources of the CPU and the individual I/O controllers.

The advance of a large-scale integrating technique results in integrating the system shown in FIG. 3 on one chip. Further, the wafer scale integrating technique is applied to the integration of the system shown in FIG. 3. In these cases, it has become more and more important to lower the power consumption of the system. Those techniques integrate the system on the silicon chip. The distributed power management system according to the invention makes it possible to control the power sources of the CPU, the individual I/O controller and the other memory so that the power consumption on the silicon chip may be distributed on the overall silicon chip. That is, this distributed power management system makes it possible to stabilize the operation of the system on the LSI and thereby realize mass production of the LSIs.

The operating frequency of the semiconductor depends on the driving voltage applied thereto. As the driving voltage becomes higher, therefore, the operating frequency becomes higher and vice versa. The distributed power management system of this invention is arranged to control the power sources of the components of the system so as to switch the driving voltages of those components. This power management system may provide the full power mode and the DC-biased mode as described above. This makes it possible to lower the power consumption of the system configuration on the LSI and keep the processing speed of the overall power management system constant by switching on and off the system. It means that the processing speed can be made higher when the system configuration is in operation, while the processing speed can be made lower when it is inoperative.

Figure 15:
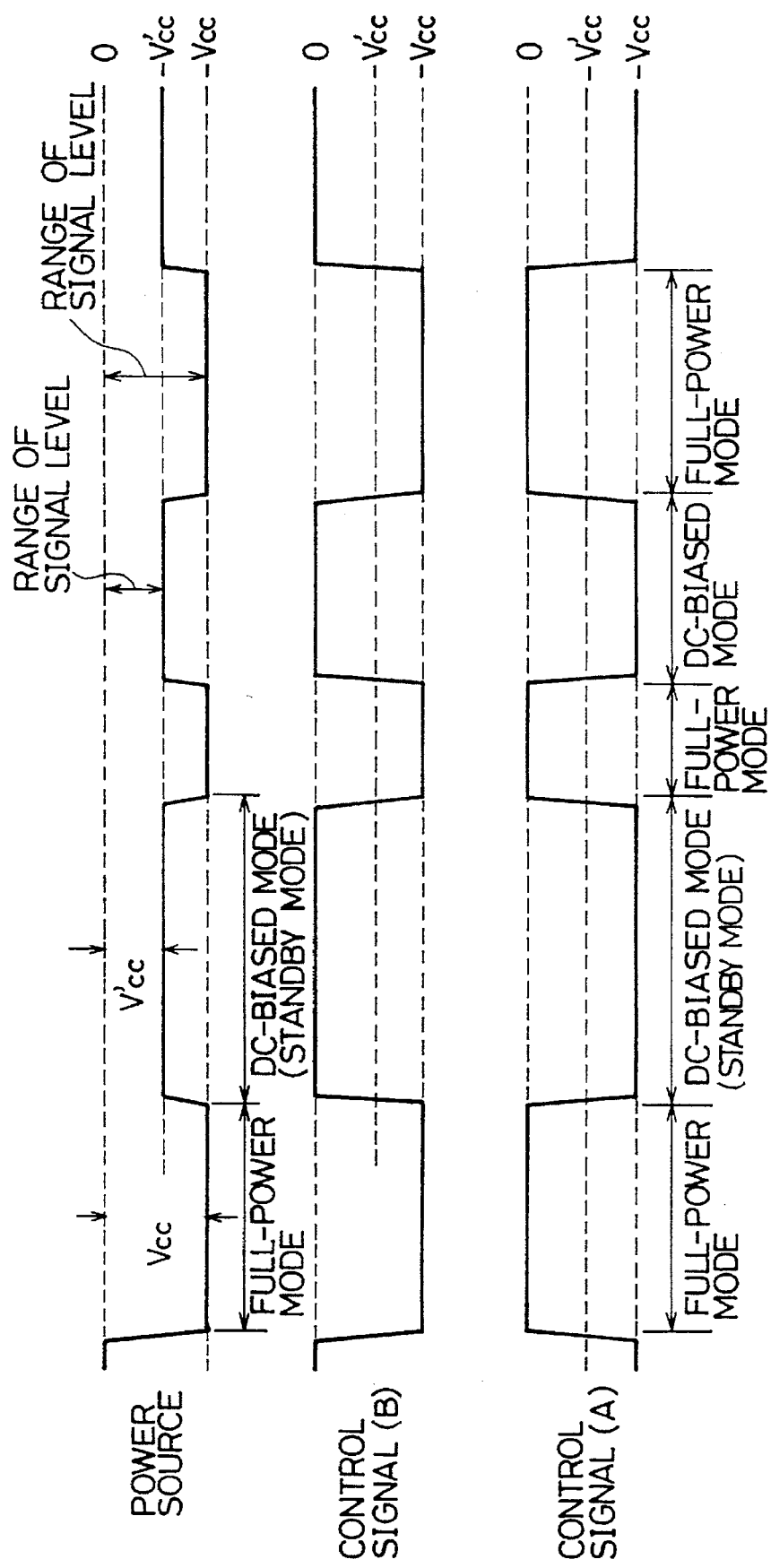
FIG. 15 is a timing chart showing a signal waveform occurring in the power control shown in FIG. 7 and a change of a power source being switched by control signals A and B.

FIG. 15 is a timing chart showing how the power source is switched in response to the power control signal waveform and the control signals A and B. The power control operation is shown in FIG. 7.

That is, FIG. 15 shows the waveforms of the control signals A and B for controlling the power sources of the CPU and the I/O controller through an external power control unit (for synthesizing the control signals A and B from the I/O signals input at the power control port of the parallel I/O controller).

The waveforms of the control signals A and B depend on the functional characteristics of the CPU and each I/O controller and the system configuration.

Figure 16:
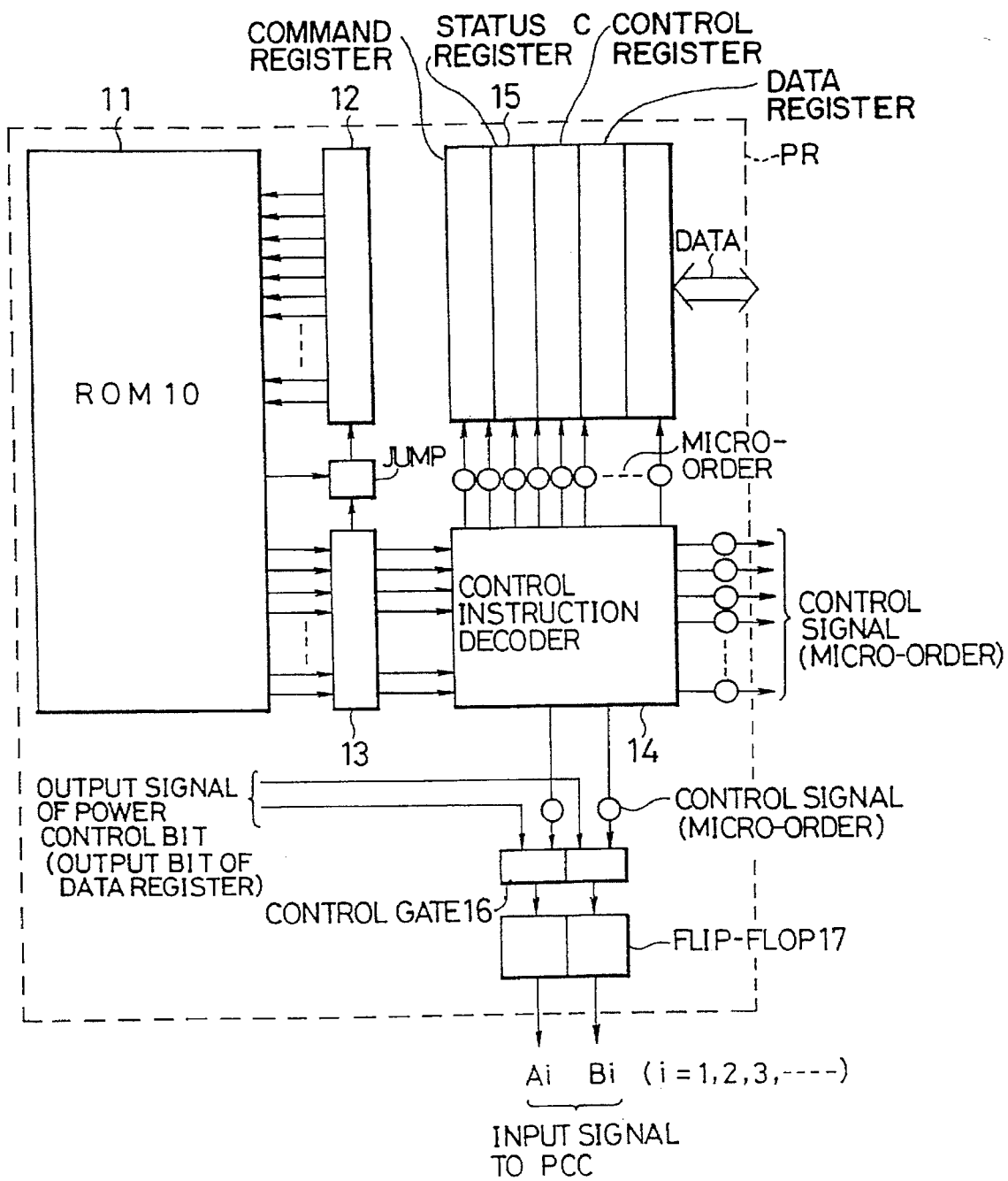
FIG. 16 is a block diagram showing a second embodiment of the power management unit, that is, an private control unit having a capability of controlling a power source by itself.

FIG. 16 is a block diagram showing the power control system according to the second embodiment of the invention.

As shown in FIG. 16, the private control unit PR is arranged to control the power source by itself. The private control unit PR provides an addition of a logic block into the power control system of the first embodiment shown in FIG. 1. This logic block serves to perform the power control operation.

The additional logic block is arranged to have a control gate 16 and a flip-flop 17 connected to the control gate The control gate 16 receives a micro-order and a power control bit, that is, an output bit of the data register. The flip-flop 17 is switched on and off in response to the output of the control gate 16 and operates to supply a signal Ai or Bi in response to the on or off state of the flip-flop 17.

Figure 17:
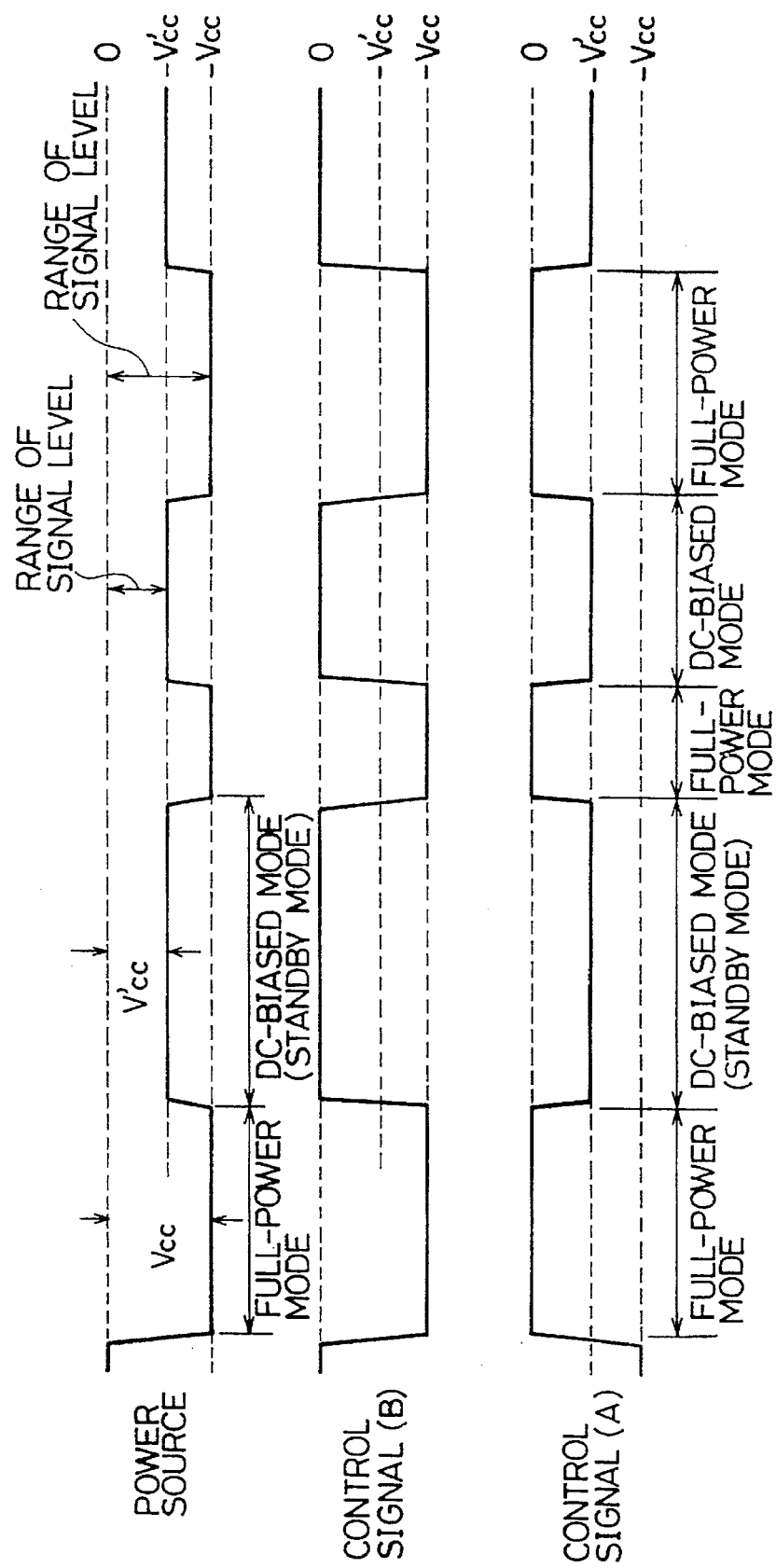
FIG. 17 is a timing chart for illustrating how the private control unit shown in FIG. 16 operates.

FIG. 17 is a timing chart showing the waveforms of control signals A and B for controlling the power sources. At a time, the variation of the power source controlled by the control signals A and B is also illustrated in FIG. 17.

The control signal A is controlled by the private control unit PR itself. Hence, at the standby mode, the power source is switched to −V'cc. This results in lowering the signal level of the signal A as shown in FIG. 17. At the full power mode, the control signal B is switched to −Vcc. This results in lowering the signal level of the signal B as shown in FIG. 17. It means that the control signal B puts the system to the standby mode and the control signal A puts the system to the full power mode.

Figure 18:
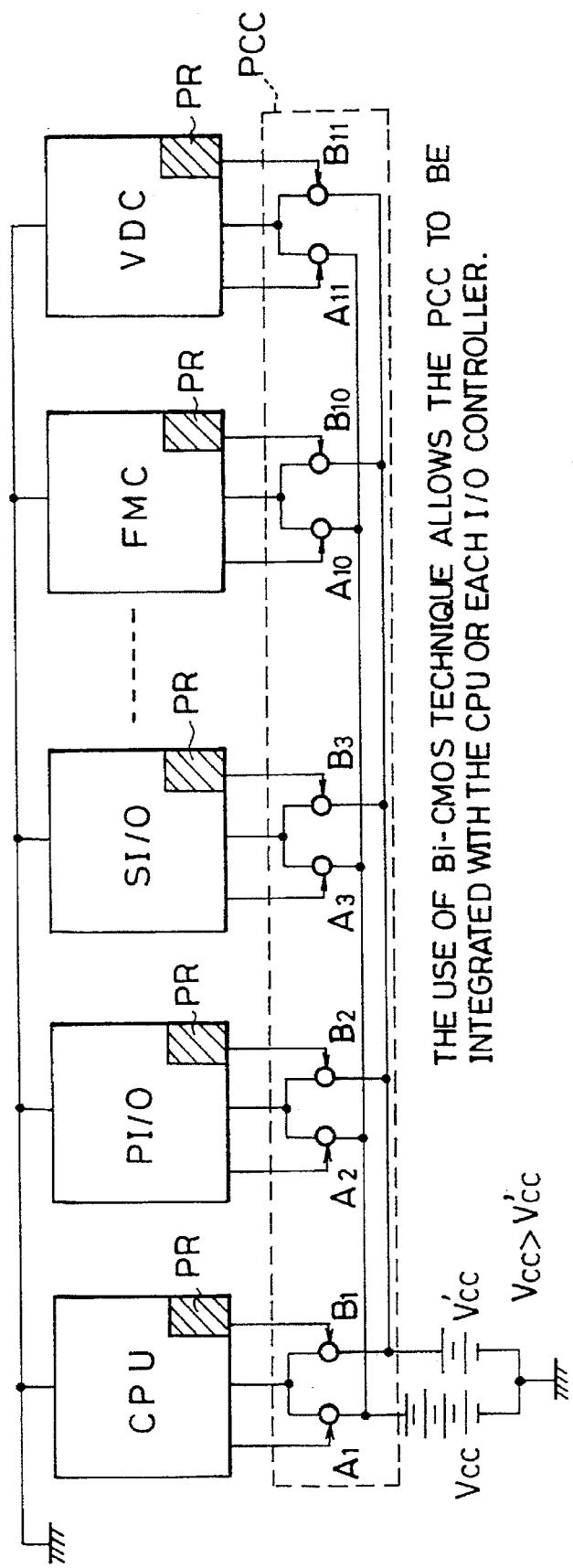
FIG. 18 is a block diagram showing a system arranged to control the power by the private control unit itself.

FIG. 18 is a block diagram showing the configuration where the private control unit PR performs the power control by itself. The waveforms of the control signals A and B depend on the functional characteristics of the CPU and each I/O controller and each system configuration.

Figure 19:
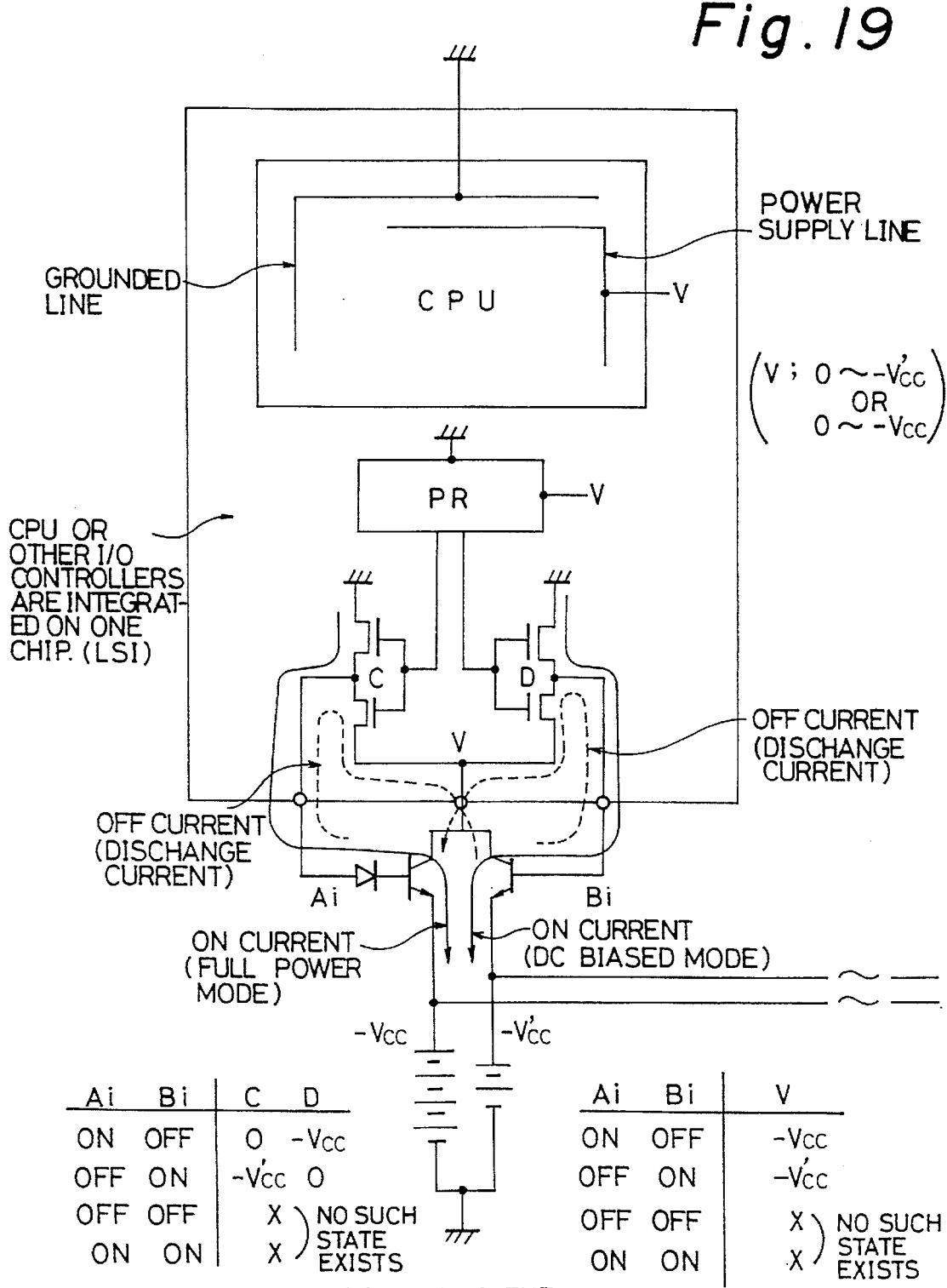
FIG. 19 is an explanatory view showing a part of a CPU included in the private control unit shown in FIG. 18.

FIG. 19 shows the arrangement relevant to the CPU shown in FIG. 18 in detail.

As shown in FIG. 19, the CPU is arranged to have an private control unit PR and a transistor circuit connected to the private control unit PR and a PCC. The on current and the off current flows between the transistor circuit and the terminals Ai or Bi of the PCC.

As shown, the CPU and the other I/O controller each contain Bi-CMOS, which is connected to the terminals Ai and Bi of the PCC and the corresponding one of the private control units PR of the CPU and the other I/O controller.

Then, Table 11 lists power management instructions to be issued by the command register shown in FIG. 1.

TABLE 11

Power Management Orders to be Executed by Individual Control Unit PR of Parallel I/O

| Title of Order | Description of Order | Abbreviation | | PI/O |
|---|---|---|---|---|
| Clock Down | First Bit of CR2 | CR2 (1) | 1 | O |
| Clock Control | Second Bit of CR2 | CR2 (2) | 1 | O |
| Timeout | Third Bit of CR2 | CR2 (3) | 0 | X |
| Undefined (Definable) | Fourth Bit of CR2 | CR2 (4) | 0 | O |
| DC-biased Mode | Fifth Bit of CR2 | CR2 (5) | 1 | O |
| Power Off | Sixth Bit of CR2 | CR2 (6) | 1 | O |
| Display Power Off | Seventh Bit of CR2 | CR2 (7) | 1 | O |
| Backlight Power Off | Eighth Bit of CR2 | CR2 (8) | 1 | O |
| Power On | First Bit of CR1 | CR1 (1) | 0 | O |
| Speed Down | Second Bit of CR1 | CR1 (2) | 1 | O |
| Speed Full | Third Bit of CR1 | CR1 (3) | 1 | O |

TABLE 11-continued

Power Management Orders to be Executed by
Individual Control Unit PR of Parallel I/O

| Title of Order | Description of Order | Abbreviation | PI/O | |
|---|---|---|---|---|
| Undefined | Fourth Bit of CR1 | CR1 (4) | 0 | X |
| (Definable) | Fifth Bit of CR1 | CR1 (5) | 0 | X |
| | Sixth Bit of CR1 | CR1 (6) | 0 | X |
| | Seventh Bit of CR1 | CR1 (7) | 0 | X |
| | Eighth Bit of CR1 | CR1 (8) | 0 | X |

Table 12 lists the contents of the command register shown in FIG. 1

TABLE 12

Command Register CR (8 bits × 2)
(When powered on, the instructions are pre-set according to the program.)

| 8 | 7 | 6 | 5 | 4 | 3 | 2 | 1 | CR2 |
|---|---|---|---|---|---|---|---|---|
| 8 | 7 | 6 | 5 | 4 | 3 | 2 | 1 | CR1 |

Table 13 lists the content of the status register shown in FIG. 1.

TABLE 13

Status Register SR (8 bits × 2)

| SM3 | SM2 | SM1 | M/S | NM1 | SMI11 | SMI10 | SMI9 | SR2 |
|---|---|---|---|---|---|---|---|---|
| SMI8 | SMI7 | SMI6 | SMI5 | SMI4 | SMI3 | SMI2 | SMI1 | SR1 |

SM3, SM2, SM1: indicates the state of the system.
M/S: indicates a switch flag of master or slave.
NM1 (SK key input): Non Maskable Interrupt
SMI1 to SMI11: System Management Interrupt Table 14 lists the concrete contents of SM3, SM2 and SM1 standing for the state shown in Table 13.

TABLE 14

| SM3 | SM2 | SM1 | State of Each Device |
|---|---|---|---|
| 0 | 0 | 0 | Initializing State |
| 0 | 0 | 1 | Waiting State |
| 0 | 1 | 0 | Waiting & Saving State |
| 0 | 1 | 1 | Executing State |
| 1 | 0 | 0 | |
| 1 | 0 | 1 | Undefined (Definable) |
| 1 | 1 | 0 | |
| 1 | 1 | 1 | |

Table 15 lists the switch logics of SMI1 to SMI11 listed in Table 13.

TABLE 15

| Type | Switch Logic of PR and parallel I/O |
|---|---|
| SMI1 | SMI of VDE |
| SMI2 | SMI of FMC |
| SMI3 | SMI of Serial I/O (II) |
| SMI4 | SMI of DMAC |
| SMI5 | SMI of INTC |
| SMI6 | SMI of CTC |
| SMI7 | SMI of RTC |
| SMI8 | SMI of Parallel I/O |
| SMI9 | SMI of Serial I/O (I) |
| SMI10 | SMI of KBC |
| SMI11 | SMI of CPU |

Table 16 lists the content of the control register shown in FIG. 1.

TABLE 16

Control Register CLR (8 bits × 2)

| 8 | 7 | 6 | 5 | 4 | 3 | 2 | 1 | CLR 2 (Clock Down Value) |
|---|---|---|---|---|---|---|---|---|
| 8 | 7 | 6 | 5 | 4 | 3 | 2 | 1 | CLR 1 (Timeout Value) |

Each value is set according to the program.
Tables 17 and 18 lists the clock down values and the time out values of the control register.

TABLE 17

| | Clock Down Value |
|---|---|
| First Bit of CLR 2 is set | 1/4 |
| Second Bit of CLR 2 is set | 1/8 |
| Third Bit of CLR 2 is set | 1/12 |
| Fourth Bit of CLR 2 is set | 1/16 |
| Fifth Bit of CLR 2 is set | 1/20 |
| Sixth Bit of CLR 2 is set | Speed down |
| Seventh Bit of CLR 2 is set | Speed full |
| Eighth Bit of CLR 2 is set | Clock Stop |

TABLE 18

| | Timeout Value |
|---|---|
| First Bit of CLR 1 is set | 4 times |
| Second Bit of CLR 1 is set | 8 times |
| Third Bit of CLR 1 is set | 12 times |
| Fourth Bit of CLR 1 is set | 16 times |
| Fifth Bit of CLR 1 is set | 20 times |
| Sixth Bit of CLR 1 is set | 24 times |
| Seventh Bit of CLR 1 is set | 28 times |
| Eighth Bit of CLR 1 is set | 32 times |

Tables 19 and 20 list the content and the concrete instructions of the data register shown in FIG. 1

TABLE 19

Data Register DR (8 bits × 2)
(The flag of each bit is set according to the program
and the set flag is output to the power control port.)

| 8 | 7 | 6 | 5 | 4 | 3 | 2 | 1 | DR2 |
|---|---|---|---|---|---|---|---|---|
| 8 | 7 | 6 | 5 | 4 | 3 | 2 | 1 | DR1 |

TABLE 20

| Title of Instruction | Description of Instruction | |
|---|---|---|
| Power Control of VDC | First Bit of DR1 | |
| Power Control of FMC | Second Bit of DR1 | |
| Power Control of Serial I/O (II) | Third Bit of DR1 | |
| Power Control of DMAC | Fourth Bit of DR1 | |
| Power Control of INTC | Fifth Bit of DR1 | *1 |
| Power Control of CTC | Sixth Bit of DR1 | |

TABLE 20-continued

| Title of Instruction | Description of Instruction | |
|---|---|---|
| Power Control of RTC | Seventh Bit of DR1 | |
| Power Control of Parallel I/O | Eighth Bit of DR1 | |
| Power Control of Serial I/O (I) | First Bit of DR2 | |
| Power Control of KBC | Second Bit of DR2 | |
| Power Control of CPU | Third Bit of DR2 | |
| Display Power Off | Fourth Bit of DR2 | |
| Backlight Power Off | Fifth Bit of DR2 | *2 |
| Power Off | Sixth Bit of DR2 | |
| Power On | Seventh Bit of DR2 | |
| Display/Backlight Power On | Eighth Bit of DR2 | |

*1: Power control flag of each device
*2: Definable power control flag

The power management instructions and the contents of each register shown in the above-mentioned Tables 11 to 20 are mere examples.

Figure 20:
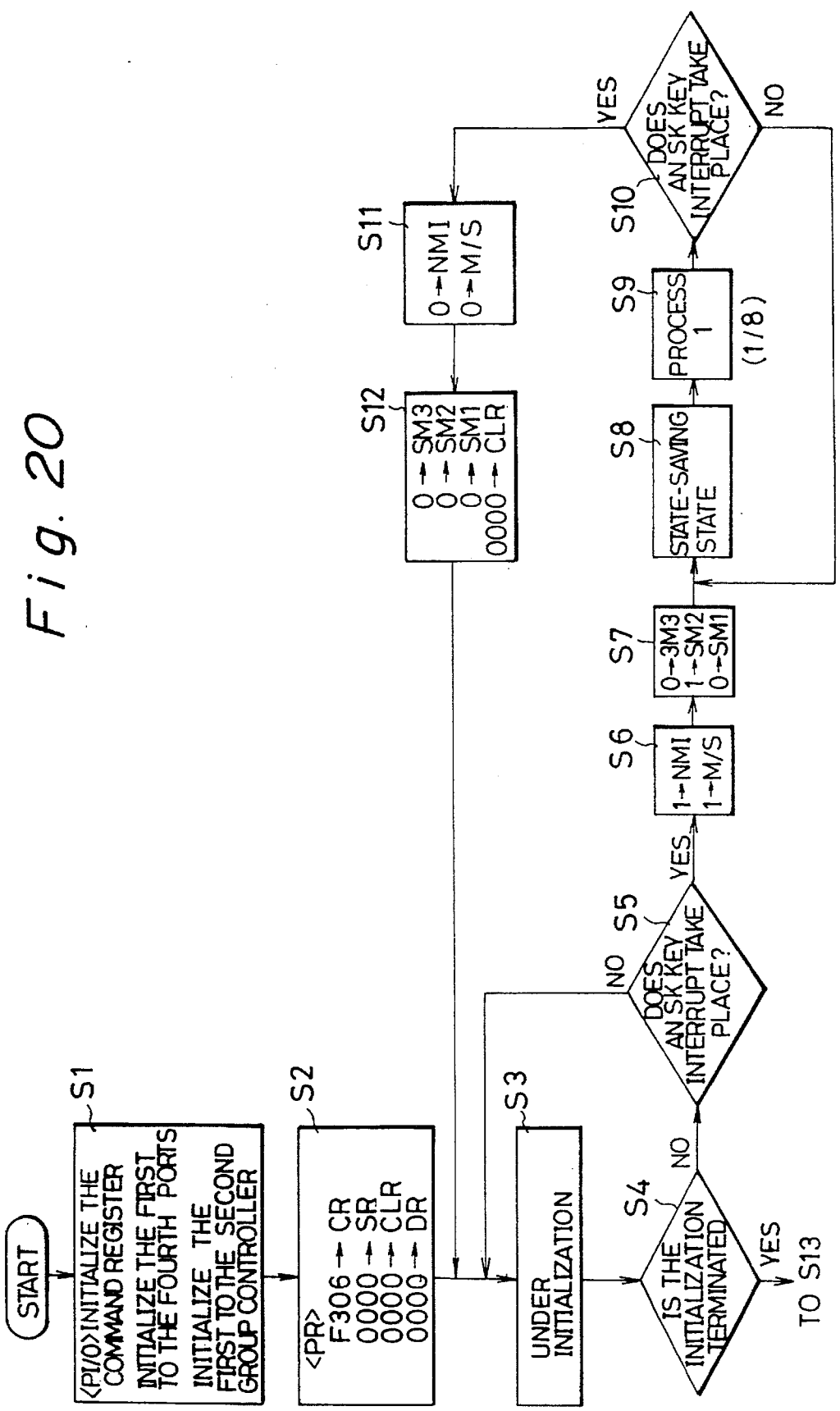
FIG. 20 is a first flowchart for explaining an operation of an private control unit configuring a parallel I/O controller shown in FIG. 1.
Figure 21B:
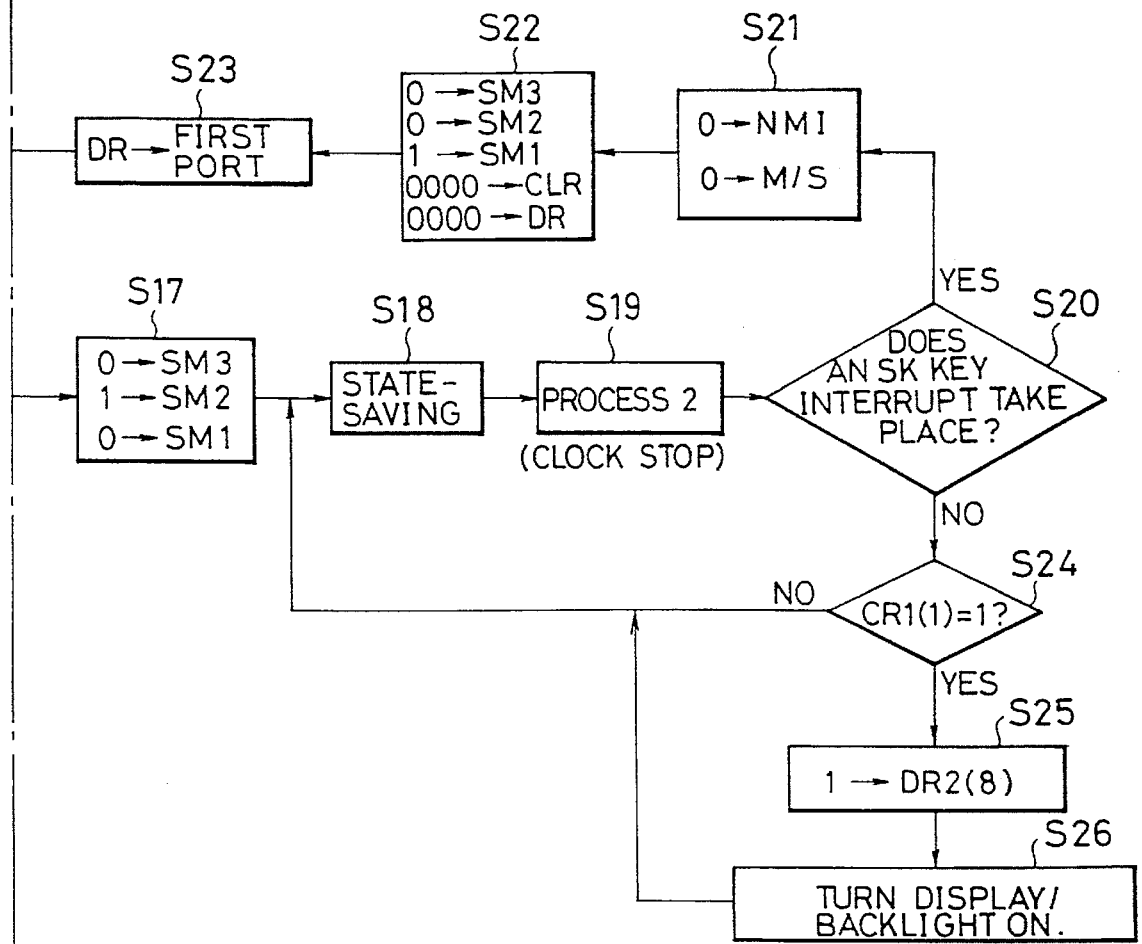

Next, the description will be oriented to how the private control unit PR of the parallel I/O shown in FIG. 1 performs power management depending on one system application by referring to the Tables 11 to 20 and FIGS. 20 to 22.

At first, in FIG. 20, the operation at a first step (S1) is executed to initialize the command register, the first to the fourth ports, the first group control unit and the second group control unit included in the parallel I/O controller shown in FIG. 9. Then, the command register CR included in the private control unit PR of the parallel I/O controller is set to F308 (hexadecimal) and the status register SR, the control register CLR and the data register DR included therein are all set to 0000 (hexadecimal) (step S2). The private control unit PR of the parallel I/O controller is initialized (step S3). At the next step (84), it is determined whether or not the initialization has been completed. If no at the step S4, it is determined whether or not a special key (SK key) interrupt takes place (step S5). If no at the step S5, the operation returns to the step S3 from which the routine is repeated until the SK key interrupt takes place. If yes at the step S5, a "non-maskable interrupt" (referred to as an NMI) is set to 1 and a master/slave flag (referred to as an M/S) is set to 1 at a time (step S6). At the next step S7, SM3 is set to 0, SM2 is set to 1 and SM1 is set 0, each SM standing for the state of the system, so that "saving state" (see Table 14) takes place (step S8). Then, the process 1 is executed (step S9).

Next, the process 1 will be described below as referring to FIG. 23.

Figure 23:
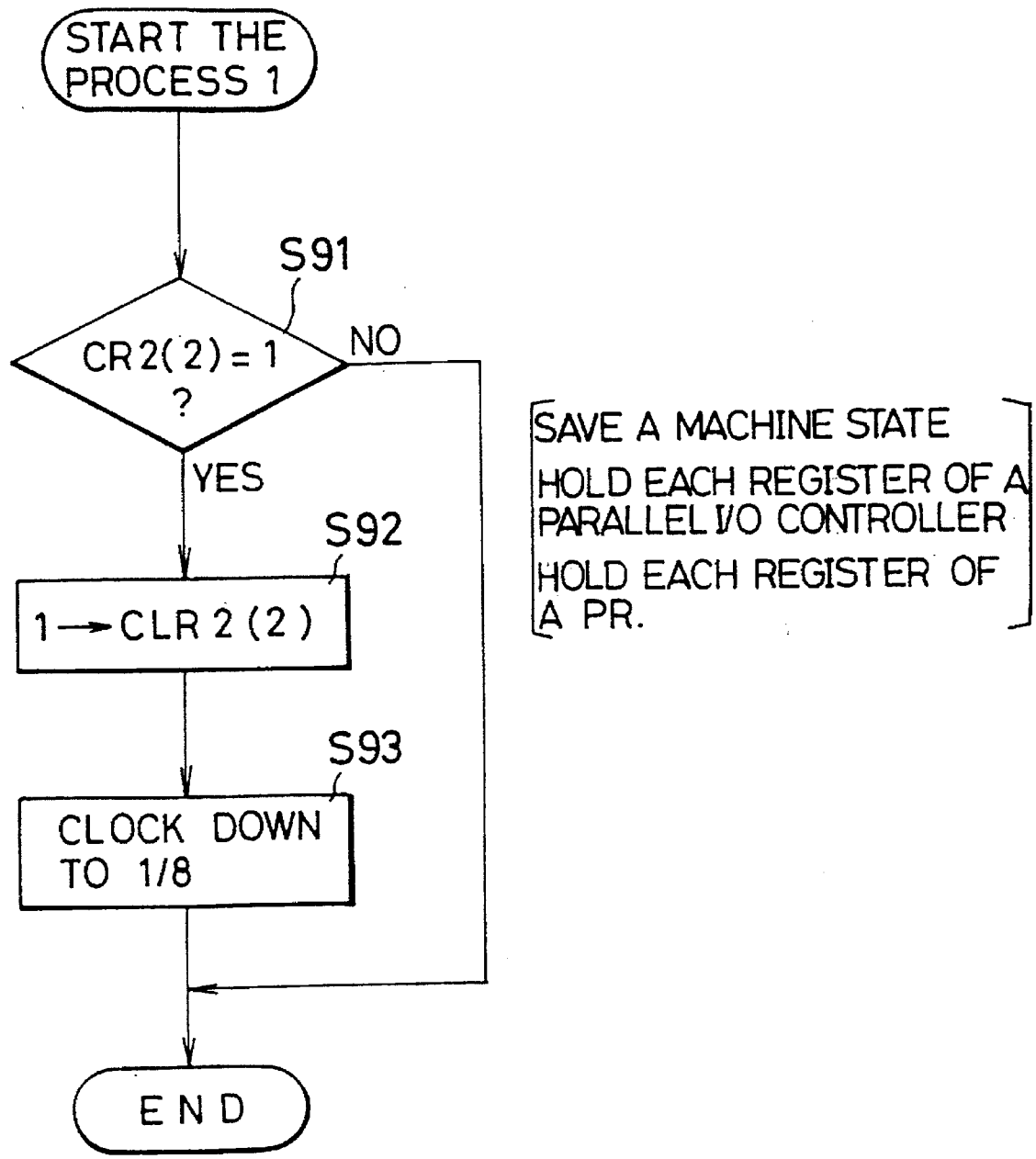
FIG. 23 is a flowchart for explaining a process 1 shown in FIG. 20.

As shown in FIG. 23, the process 1 is executed to determine whether or not the second bit CR2(2) of the command register CR2 is 1 (that is, the command register controls the clock of the system) at a step S91. If the CR2(2) of the command register is 1 (yes) at the step S91, the second bit CLR2(2) of the control register CLR2 is set to 1 (step S92). Then, the clock down value is set to a ⅛ time (see Table 17) (step S93). In place, if the CR2(2) of the command register CR2(2) is not 1, the process 1 is terminated.

Turning to FIG. 20, after the process 1 is terminated, again, it is determined whether or not the SK key interrupt takes place (step S10). If no, the operation returns to the "state saving" at the step S8. If yes, the NMI and the M/S are both reset to 0 (step S11). Then, the SM3, the SM2, and the SM1 are reset to 0 and the control register CLR is reset to 0000 (step S12). The operation returns to the step S3.

As shown in FIGS. 20, 22(i) and 22(ii), if the initialization of the private control unit PR of the parallel I/O controller is terminated (yes) at the step S4, the SM3 and the SM2 are both set to 0 and the SM1 is set to 1 (step S13) so that the system may enter into the "saving state" (step S14). At the next step, it is determined whether or not the SK key interrupt takes place (step S15). If yes at the step S15, the NMI and the M/S are both set to 1 (step S16). Then, the SM3 is set to 0, the SM2 is set to 1 and the SM1 is set to 0 (step S17) so as to put the system into the "saving state" (see Table 14) (step S18). Here, the process 2 is executed (step S19).

The process 2 will be described below as referring to FIG. 24.

Figure 24:
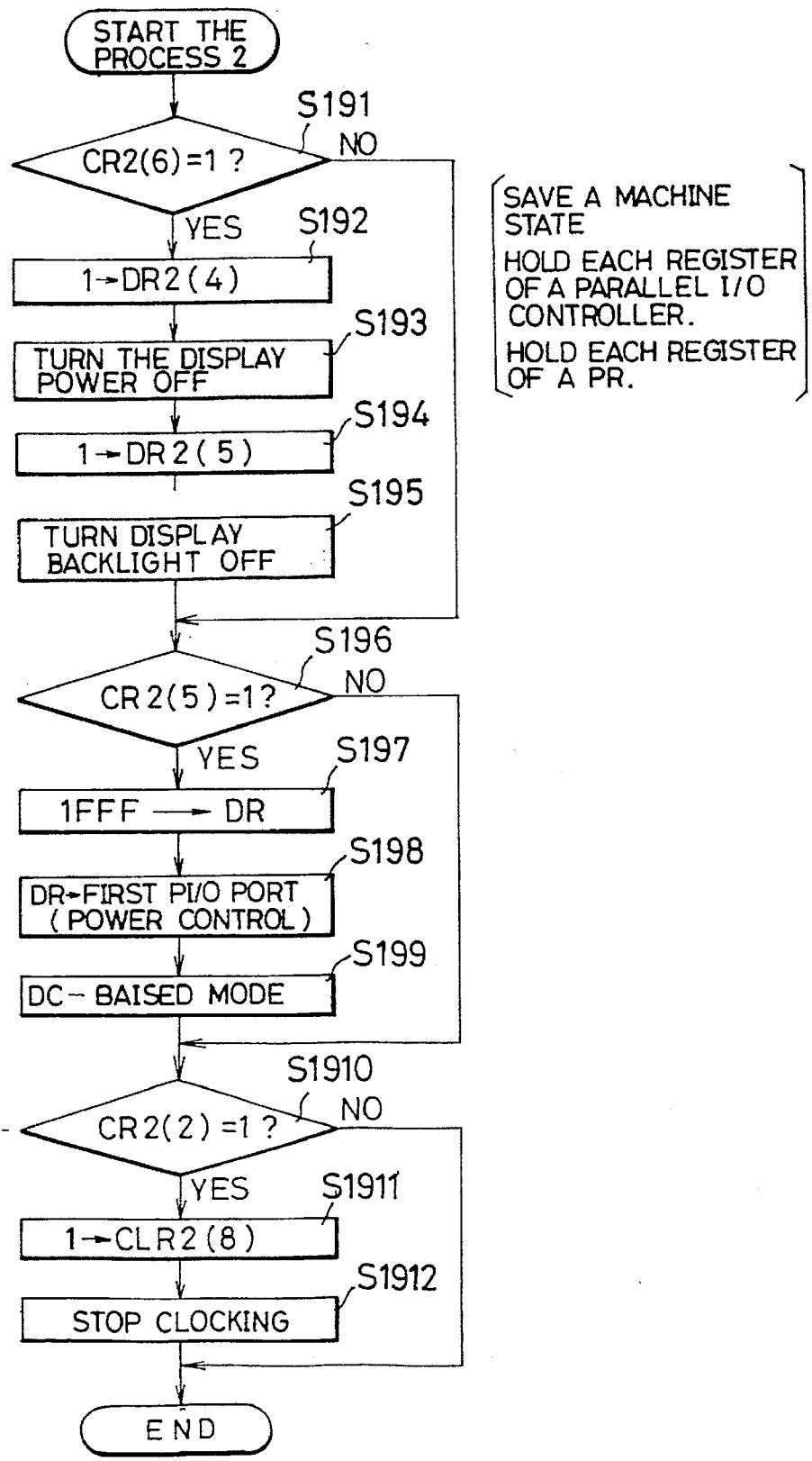
FIG. 24 is a flowchart for explaining a process 2 shown in FIGS. 21(A) and 21(B)

As shown in FIG. 24, the process 2 is executed to determine whether or not the sixth bit CR2(6) of the command register CR2 is 1 (the command register turns off the power) (step S191). If yes at the step S191, the fourth bit DR2(4) of the data register DR2 is set to 1 (step S192) for turning off the display power (see Table 20) (step S193). The fifth bit DR2(5) of the data register DR2 is set to 1 (step S194). Then, the backlight is turned off (see Table 20) (step S195).

In succession, it is determined whether or not the fifth bit CR2(5) of the command register CR2 is 1 (that is, the command register puts the system into the DC-biased mode) (step S196). If yes at the step S196, the data register DR is set to 1FFF (step S197), so that the content of the data register DR is output to the first port (step S198) for putting the system into the DC-biased mode (step S199).

Next, it is determined whether or not the second bit CR2(2) of the command register CR2 is 1 (that is, the command register controls the clock on which the system operates) (step S1910). If yes at the step S1910, the eighth bit CLR2(8) of the control register CLR2 is set to 1 (step S1911) for stopping the clock (see Table 17) (step S1912).

Turning to FIGS. 21(i) and 22(ii), after the process 2 is terminated, it is determined whether or not the SK key interrupt takes place again (step S20). If yes at the step S20, the NMI and the M/S are both reset to 0 (step S21), the SM3 and the SM2 are reset to 0, the SM1 is set to 1, the control register CLR is reset to 0000, and the data register DR is reset to 0000 (step S22). The content of the data register DR is output to the first port (step S23) and then the operation returns to the step S14.

If it is determined that no SK key interrupt takes place at the step S20, it is determined whether or not the first bit CRI(1) of the command register CR1 is 1 (that is, the command register turns on the power of the system) (step S24). If no at the step S24, the operation returns to the step S18. If yes at the step S24, the eighth bit DR2(8) of the data register DR2 is set to 1 (step S25). The display and the backlight are turned on (step S26). Then, the operation returns to the step S18.

If it is determined that no SK key interrupt takes place at the step S15, the process 3 is executed (step S27).

Herein, the process 3 will be described below as referring to FIG. 25.

Figure 25:
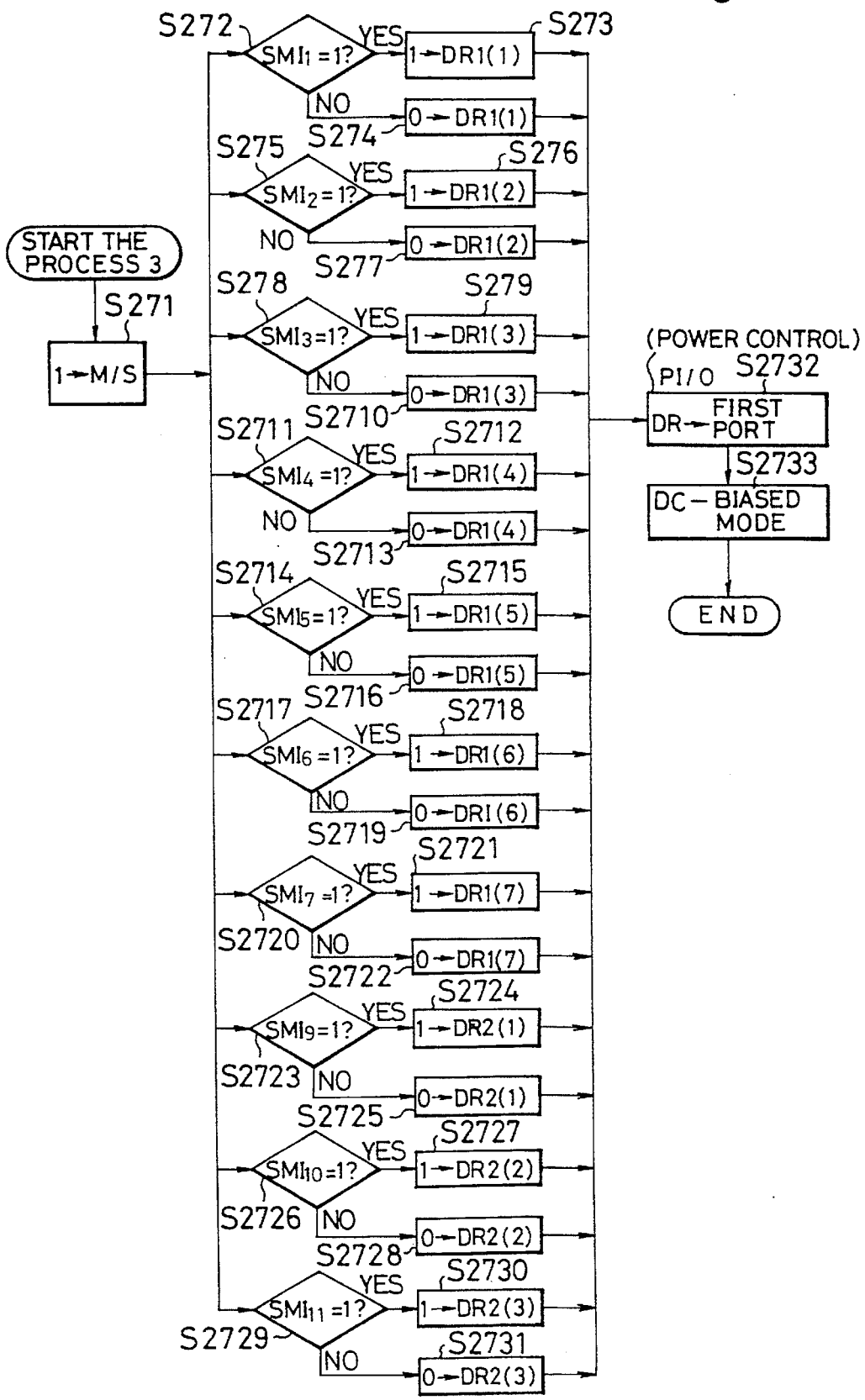
FIG. 25 is a flowchart for explaining a process 3 shown in FIGS. 21(A) and 21(B) and FIGS. 22(A) and 22(B)

As shown in FIG. 25, at first, the process 3 is executed to set the M/S to 1 (step S271) and determine whether or not SMI1 of "System Management Interrupt" (referred to as SMI) is 1 (step S272). If yes at the step S272, the first bit DR1(1) of the data register DR1 is set to 1 (that is, the power control unit of the VDC is turned on) (step S273). If no at the step S272, the first bit DR1(1) is set to 0 (step S274).

In succession, it is determined whether or not the SMI2 is 1 (step S275). If yes at the step S275, the second bit DR1(2) of the data register DR1 is set to 1 (that is, the power control unit of the FMC is turned on) (step S276). If no at the step S275, the DR1(2) is set to 0 (step S277).

At the next step, it is determined whether or not the SMI3 is 1 (step S278). If yes at the step S278, the third bit DR1(3) of the data register DR1 is set to 1 (that is, the power control of the serial I/O (II) controller is made operative) (step S279). If no at the step S278, the DR1(3) is set to 0 (step S2710).

Likewise, it is determined whether or not SMI4 is 1 (step S2711). If yes at the step S2711, the fourth bit DR1(4) of the data register DR1 is set to 1 (that is, the power control of the DMAC is made operative) (step S2712). If no at the step S2711, the DR1(4) is set to 0 (step S2713).

At the next step, it is determined whether or not the SMI5 is 1 (step S2714). If yes at the step S2714, the fifth bit DR1(5) of the data register DR1 is set to 1 (that is, the power control of the INTC is operative) (step S2715). If no at the step S2714, the DR1(5) is set to 0 (step S2716).

It is determined whether or not the SMI6 is 1 (step S2717). If yes at the step S2717, the sixth bit DR1(6) of the data register DR1 is set to 1 (that is, the power control of the CTC is made operative). If no at the step S2717, the DR1(6) is set to 0 (step S2719).

At the next step, it is determined whether or not the SMI7 is 1 (step S720). If yes at the step, the seventh bit DR1(7) of the data register DR1 is set to 1 (that is, the power control of the RTC is made operative) (step S2721). If no at the step S2720, the DR1(7) is set to 0 (step S2722). Likewise, it is determined whether or not the SMI9 is 1 (step S2723). If yes at the step S723, the first bit DR2(1) of the data register DR2 is set to 1 (that is, the power control of the serial I/O(I) controller is made operative) (step S2724). If no at the step S723, the DR2(1) is set to 0 (step S2725).

At the next step, it is determined whether or not the SMI10 is set to 1 (step S2726). If yes at the step S2726, the second bit DR2(2) of the data register DR2 is set to 1 (that is, the power control of the KBC is made operative) (step S2727). If no at the step S2726, the DR2(2) is set to 0 (step S2728).

Next, it is determined whether or not the SMI11 is 1 (step S2728). If yes at the step S2729, the third bit DR2(3) of the data register DR2 is set to 1 (that is, the power control of the CPU is made operative) (step S2730). If no at the step S2729, the DR2(3) is set to 0 (step S2731). The contents of the data register DR is output to the first port of the parallel I/O controller (step S2732) for setting the DC-biased mode (step S2733). It means that the process 3 is executed to control the power of the device requested by the SMI.

Turning to FIG. 21(i), after the process 3 is terminated, it is determined whether or not an execution event takes place (step S28). If no at the step S28, it is determined whether or not the first bit CR2(1) of the command register CR2 is 1 (step S29). If no at the step S29, the operation returns to the step S14.

As shown in FIGS. 21(i), 21(ii), and 22(ii), if it is determined that the CR2(1) is 1 at the step S29, the third bit CLR2(3) of the control register CLR2 is set to 1 (step S30) for reducing a clock down value to a factor of 1/12 (step S31).

On the other hand, if the execution even takes place at the step S28, the status register SR, the control register CLR and the data register DR are set to 0000 and the M/S is set to 0 (step S32). Then, the content of the data register DR is output to the first port (step S33), so that the SM3 is set to 0, the SM2 is set to 1 and the SM1 is set to 1 (step S34) for putting the system into an execution state (step S35). At the next step, it is determined whether or not a print instruction is issued (step S36). If no at the step S35, it is determined whether or not the SK key interrupt takes place (step S37). If yes at the step S37, the NMI and the M/S are both set to 1 (step S38), the SM3 is set to 0, the SM2 is set to 1 and the SM1 is set to 0 (step S39) for putting the system into the saving state (step S40). Then, a process 4 is executed (step S41).

The process will be described as referring to FIG. 26

Figure 26:
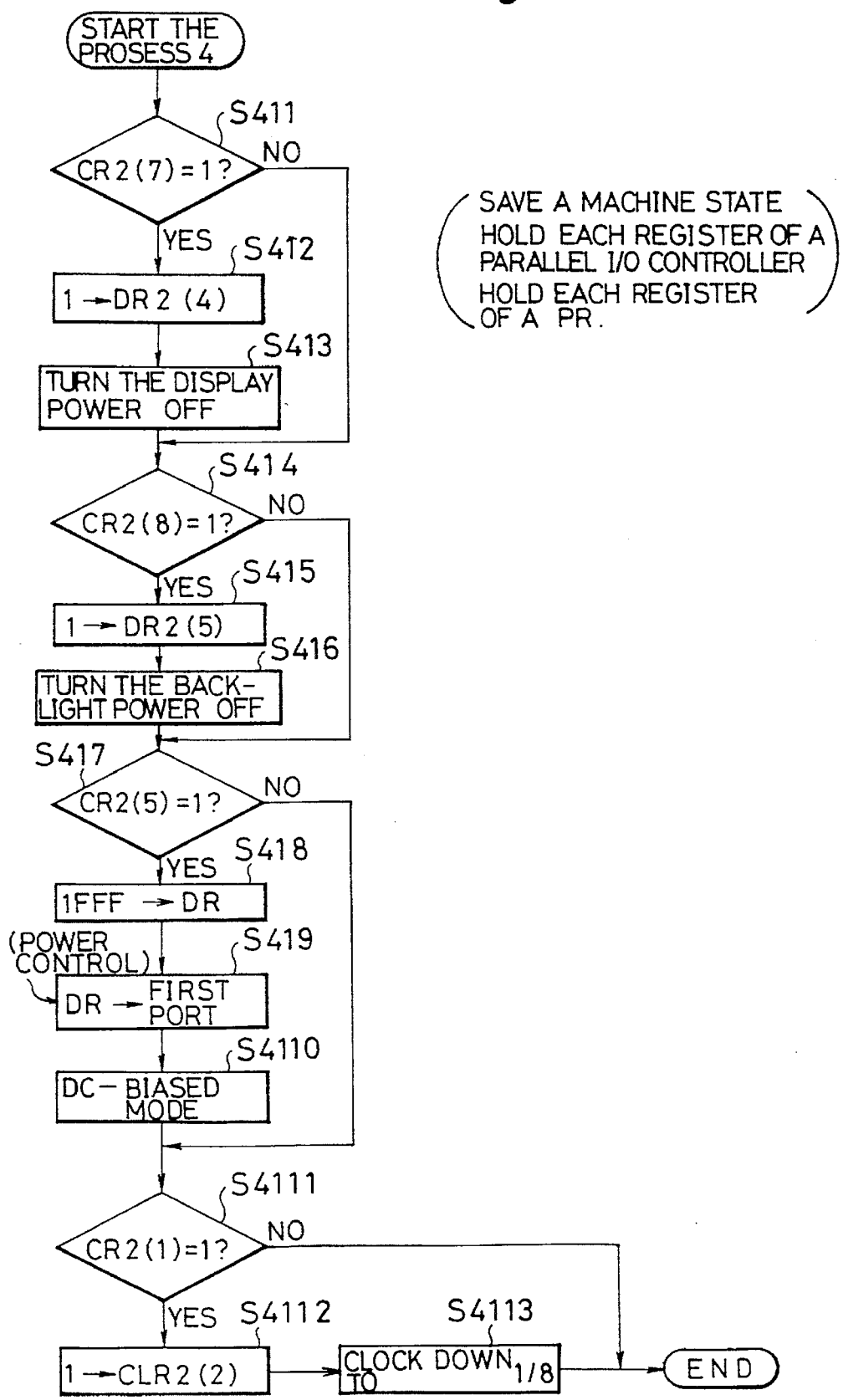
FIG. 26 is a flowchart for explaining a process 4 shown in FIGS. 22(A) and 22(B)

The process 4 shown in FIG. 26 is executed to determine whether or not the seventh bit CR2(7) of the command register CR2 is 1 (step S411). If yes at the step S4111, the fourth bit DR2(4) of the data register DR2 is set to 1 (step S412) for setting off the power of the display (step S413). Then, it is determined whether or not the eighth bit CR2(8) of the command register CR2 is 1 (step S414). If yes at the step S414, the fifth bit DR2(5) of the data register DR2 is set to 1 (step S415) for setting off the power of the backlight (step S416). At the next step, it is determined whether or not the fifth bit CR2(5) of the command register CR2 is 1 (step S417). If yes at the step S417, the data register DR is set to 1FFF (step S418) and the content of the data register DR is output to the first port (step S419) for putting the device into the DC-biased mode (step S4110). At the next step, it is determined whether or not the first bit CR2(1) of the command register CR2 is 1 (step S4111). If yes at the step S4111, the second bit CLR2(2) of the control register CLR2 is set to 1 (step S4112) for reducing the clock down value into a factor of 1/8 (step S4113).

Turning to FIG. 22, after the process 4 is terminated, it is determined whether or not the SK key interrupt takes place (step S42). If yes at the step S42, the NMI and the M/S are both reset to 0 (step S43), the control register CLR is reset to 0000, and the data register DR is reset to 0000 (step S44). The operation returns to the step S33. At the step S42, if it is determined that no SK key interrupt takes place, the operation returns to the step S40.

At the step S37, if it is determined that no SK key interrupt takes place, a process 5 is executed (step S45). Herein, the process 5 will be described later as referring to FIG. 27.

Figure 27:
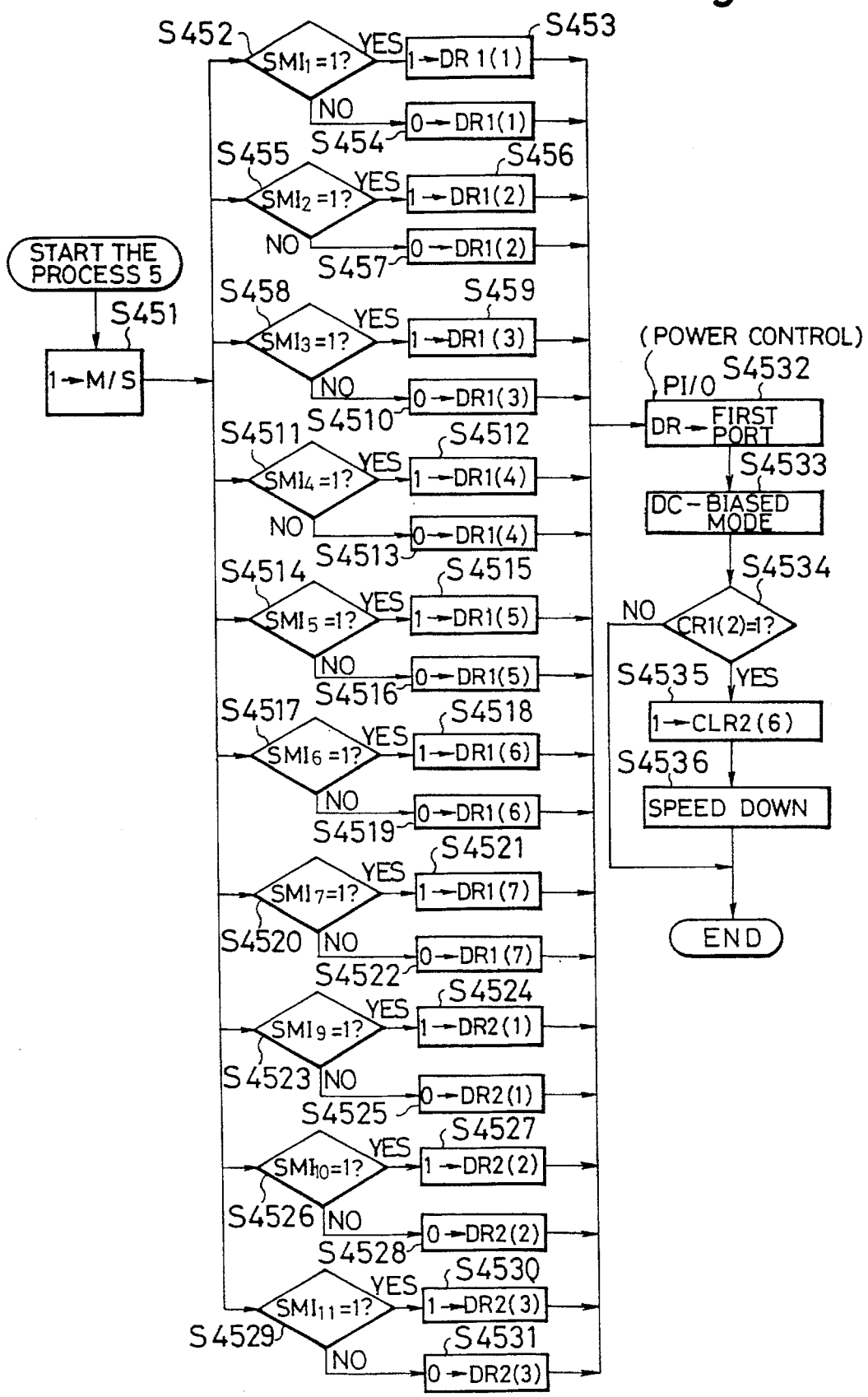
FIG. 27 is a flowchart for explaining a process 5 shown in FIGS. 22(A) and 22(B)

As shown in FIG. 27, the process 5 is executed to set the M/S to 1 (step S451) and determine whether or not the SMI1 is 1 (step S452). If yes at the step S452, the first bit DR1(1) of the data register DR1 is set to 1 (that is, the power control of the VDC is made operative) (step S453). If no at the step S452, the DR(1) is set to 0 (step S454).

It is determined whether or not the SMI2 is 1 (step S455). If yes at the step S455, the second bit DR1(2) of the data register DR1 is set to 1 (that is, the power control of the FMC is made operative) (step S456). If no at the step S455, the DR1(2) is set to 0 (step S457).

It is determined whether or not the SMI3 is 1 (step S458). If yes at the step S458, the third bit DR1(3) of the data register DR1 is set to 1 (that is, the power control of the serial I/O (II) is made operative) (step S459). If no at the step S458, the DR1(3) is set to 0 (step S4510). Likewise, it is determined whether or not the SMI4 is 1 (step S4511). If yes at the step S4511, the fourth bit DR1(4) of the data register DR1 is set to 1 (that is, the power control of the DMA is made operative) (step S4512). If no at the step S4511, the DR1(4) is set to 0 (step S4513).

At the next step, it is determined whether or not the SMI5 is 1 (step S4514). If yes at the step S4514, the fifth bit DR1(5) of the data register DR1 is set to 1 (that is, the power control of the INTC is made operative) (step S4515). If no at the step S4514, the DR1(5) is set to 0 (step S4516).

Next, it is determined whether or not the SMI6 is 1 (step S4517). If yes at the step S4517, the sixth bit DR1(6) of the data register DR1 is set to 1 (that is, the power control of the CTC is made operative) (step S4518). If no at the step S4517, the DR1(6) is set to 0 (step S4519).

At the next step, it is determined whether or not the SMI7 is 1 (step S4520). If yes at the step S4520, the seventh bit DR1(7) of the data register DR1 is set to 1 (that is, the power control of the RTC is made operative) (step S4521). If no at the step S4521, the DR1(7) is set to 0 (step S4522).

In succession, it is determined whether or not the SMI9 is 1 (step S4523). If yes at the step S4523, the first bit DR2(1) of the data register DR2 is set to 1 (that is, the power control of the serial I/O(I) controller is made operative) (step S4524). If no at the step S4523, the DR2(1) is set to 0 (step S4525).

At the next step, it is determined whether or not the SMI10 is 1 (step S4526). If yes at the step S4526, the second bit DR2(2) of the data register DR2 is set to 1 (that is, the power control of the KBC is made operative) (step S4527). If no at the step S4526, the DR2(2) is set to 0 (step S4528).

Likewise, it is determined whether or not the SMI11 is 1 (step S4529). If yes at the step S4529, the third bit DR2(3) of the data register DR2 is set to 1 (that is, the power control of the CPU is made operative) (step S4530). If no at the step S4529, the DR2(3) is set to 0 (step S4531). The contents of the data register DR are output to the first port of the parallel I/O controller (step S4532) for putting the device into the DC-biased mode (step S4533). Then, it is determined whether or not the second bit CR1(2) of the command register CR1 is 1 (step S4534). If yes at the step S4534, the sixth bit CLR2(6) of the control register CLR2 is set to 1 (step S4535) for setting a clock down value to a speed down value (step S4536).

Turning to FIGS. 22(i) and 22(ii), if it is determined that the print instruction is issued at the step S36, it is determined whether or not the third bit CR1(3) of the command register CR1 is set to 1 (step S46). If no at the step S46, the operation goes to a step S49 (to be described later). If yes at the step S46, the seventh bit CLR2(7) of the control register CLR2 is set to 1 (step S47) for setting a clock down value to a speed full value (step S48). The M/S is set to 0 (step S49) and the data is printed out (step S50). Then, it is determined whether or not the SK key interrupt takes place (step S51). If yes at the step S51, the operation returns to the step S38. If no at the step S51, the process 3 is executed (step S52) and then it is determined whether or not the execution is terminated (step S53). If no at the step S53, the operation returns to the step S35. If yes at the step S53, the M/S is set to 0 and the status register SR, the control register CLR and the data register DR are all reset to 0000 (step S54). Then, the content of the data register DR is output to the first port (step S55). The SM3 is set to 0, the SM2 is set to 0 and the SM1 is set to 1 (step S56). Then, the operation returns to the step S14.

FIG. 28 shows the combination of the first embodiment shown in FIG. 7 and the second embodiment shown in FIG. 18. The components of the arrangement shown in FIG. 28 and their operations are the same as those shown in FIGS. 7 and 18. Hence, they are not descriptive herein.

The control circuit for setting the values of the clock down in Table 17 and the values of the timeout in Table 18 could be realized according to a known method, therefore it is not shown in a figure. In addition, as shown in Table 20, the control circuit for a power control according to the flag being a power control definable could be realized easily, therefore it is also not shown in a figure.

In the first embodiment, an example of detecting SMI8 of PI/O is not shown. As described in the second embodiment, for the power control by CPU and I/O controllers themselves, the private control unit PR of the PI/O detects SMI8 and sets the DC-biased mode of PI/O.

Many widely different embodiments of the present invention may be constructed without departing from the spirit and scope of the present invention. It should be understood that the present invention is not limited to the specific embodiments described in the specification, except as defined in the appended claims.

What is claimed is:

1. An apparatus for individually controlling electric power used by a digital electronic device at respective semiconductor devices composing the electronic device, the semiconductor devices having a plurality of operational modes, said apparatus comprising:

storage means for exclusively storing a power management program prepared according to a function of at least one of the plurality of operational modes of a semiconductor device at which electric power is to be individually controlled and outputting a coded electric power management order; and decoding means connected to said storage means for decoding said coded electric power management order output from said storage means and for outputting a control signal for power management therefrom to said semiconductor device.

2. An apparatus according to claim 1, wherein said apparatus further comprises:

accessing means connected to said storage means for accessing said storage means;

order-controlling means connected to said storage means for storing said coded electric power management order output from said storage means; and a plurality of registers connected to said decoding means for storing and processing the coded electric power control management order decoded by said decoding means and for outputting data for power management to said semiconductor device.

3. An apparatus according to claim 2, wherein said storage means includes a memory on which electric power management orders can be written.

4. An apparatus according to claim 3, wherein said accessing means is a counting means connected to said storage means for accessing said memory.

5. An apparatus according to claim 4, wherein said order-controlling means is a control-order register connected to said storage means, said control-order register being adapted to store said electric power management orders written on said memory.

6. An apparatus according to claim 5, wherein said decoding means is a control-order decoder connected to said control-order register, said control-order decoder being adapted to decode said electric power management orders stored in said control-order register and to output said control signal for power management.

7. An apparatus according to claim 6, wherein said plurality of registers are a group of registers connected to said control-order decoder, each of said group of registers being adapted to store and process orders of electric power management and data when a system is activated.

8. An apparatus according to claim 7, wherein said group of registers include a command register, a data register, a status register, and a control register.

9. An apparatus according to claim 6, wherein said apparatus is a private controller which includes a logic for switching a master-slave relation among a private controller, a central processing unit, and an input/output controller according to a wait-and-save event or a return-event.

10. An apparatus according to claim 9, wherein said private controller further includes a logic for detecting activation said power management according to a wait-and-save event or a return-event.

11. An apparatus according to claim 9, wherein said control-order decoder is adapted to output said control signal which is a micro-order, said micro-order being capable of controlling an input/output gate of each register inside of said private controller, registers of said central processing unit, registers of said input/output controllers, and an input/output gate of said memory devices.

12. An apparatus according to claim 11 wherein said storage means includes a read-only memory and adapted to output an order program written on said read-only memory according to a micro-order output from said control-order decoder.

13. An apparatus according to claim 4, wherein said counting means is an address counter.

14. An apparatus according to claim 3, wherein said memory is a read-only-memory.

15. An apparatus according to claim 1, wherein said apparatus and said semiconductor devices are integrated on a single chip.

16. A system for controlling electric power used by a digital electronic device having a plurality of devices interconnected through buses, including a central processing unit, a plurality of input/output controllers and memory devices, at least one of the plurality of devices having operational modes, said system comprising:
   a plurality of private control units connected to a respective one of said central processing unit and said plurality of input/output controllers for dispersively controlling electric power used by said digital electronic device at respective connected devices, each of said private control units comprising:
      storage means for exclusively storing a power management program prepared according to a function of at least one of said plurality of operational modes of said connected device and outputting a coded electric power management order; and
      decoding means connected to said storage means for decoding said coded electric power management order output from said storage means and for outputting a control signal for power management therefrom to said connected device.

17. A system according to claim 16, wherein each of said central processing unit and said input/output controllers has different kinds of transition states respectively and is capable of changing said transition states variously according to various events.

18. A system according to claim 17, wherein said private control unit is installed for each of said central processing unit and said input/output controllers separately, each of said private control unit is adapted to control an electric power dispersively according to characteristics or states of said central processing unit or said input/output controller having inherent processing characteristics so as to control an electric power of said system.

19. A system according to claim 17, wherein each of said private control units is adapted to set a power management program, said electric power in each of said central processing unit and said plurality of input/output controllers is controlled according to said power management program set by said private control units, and another private control unit outputs a request of an electric power source control to a specified private control unit and controls an electric power source of each of said central processing unit and said plurality of input/output controllers through a power control unit so as to reduce electric power.

20. A system according to claim 17, wherein each of said private control units is adapted to set a power management program, electric power in each of said central processing unit and said plurality of input/output controllers is separately controlled according to said power management program set by each of said private control units, and each of said private control units controls an electric power source in each of said central processing unit and said plurality of input/output controllers in which its own power management is performed by itself so as to reduce electric power.

21. A system according to claim 17, wherein each of said private control units is adapted to set a power management order, said electric power in each of said central processing unit and said plurality of input/output controllers is separately controlled according to said coded electric power management order set by each of said private control units, in each of said private control units, different kinds of modes enabling to reduce consumption of electric power are set, and each of said private control unit executes a power management order according to said mode so as to control said electric power.

22. A system according to claim 17, wherein said system has special keys for reducing a consumption of electric power externally by an operator, when each of said private control units detects an input of said special keys, each of said central processing unit and said plurality of input/output controllers comprising said system is set to a wait-and-save state at any time, and said system as a whole also is set to a wait-and-save state, further, when each of said private control units detects an input of said special keys again, then each of said central processing unit and said plurality of input/output controllers returns to a previous state, and said system as a whole also returns to a previous state.

23. A system according to claim 22, wherein each of said private control units performs said electric power control according to said special keys at a time when each of said private control units executes a power management order so as to reduce a consumption of an electric power.

24. A system according to claim 17, wherein said system is arranged to reduce consumption of electric power by controlling an electric power source and a clock frequency only, then said private control unit can be independently set externally, and controls electric power sources of each of said central processing unit, said input/output controllers, and other memories composing said system.

25. A system according to claim 17, wherein said private control unit is adapted to control an electric source for each of central processing unit and input/output controllers so that at time periods of high-level as well as low-level driving electric voltages, an operational frequency is also shifted upwards and downwards in a time scale.

26. A system according to claim 25, wherein said private control unit is further adapted to steadily control a processing speed of said system as a whole by reducing consumption of electric power of said system and by controlling an increase and decrease of said processing speed, according to states of said system.

27. A system according to claim 26, wherein said states of said system include an execution state and a non-execution state.

28. A system according to claim 16, wherein said private control unit further comprises:
   accessing means connected to said storage means for accessing said storage means;
   order-controlling means connected to said storage means for storing said coded electric power management order output from said storage means; and
   a plurality of registers connected to said decoding means for storing and processing the coded electric power control management order decoded by said decoding means and for outputting data for power management to said connected device.

29. A system according to claim 16, wherein said system further comprises a plurality of power control circuits connected to supply power to a respective one of said central processing unit and said plurality of input/output controllers, each of said power control circuits being so constructed to supply one of different voltages to a connected device according to power control signals from one of said plurality of input/output controllers, said one of said input/output controllers being adapted to output said power control signals according to said control signal for power management from a respective one of said private control units.

30. A system according to claim 16, wherein said private control units further includes means for generating power control signals according to said control signals for power management from said decoding means, and said system further comprises a plurality of power control circuits connected to supply power to a respective one of said central processing unit and said plurality of input/output controllers, each of said power control circuits being so constructed to supply one of different voltages to a connected device according to power control signals from said private control unit connected to the same device.

31. A system according to claim 16, wherein said system and said plurality of devices are integrated on a single chip.

* * * * *